US012099331B2

(12) United States Patent
Liang et al.

(10) Patent No.: US 12,099,331 B2
(45) Date of Patent: *Sep. 24, 2024

(54) ELECTRONIC WATCH WITH BAROMETRIC VENT

(71) Applicant: Apple Inc., Cupertino, CA (US)

(72) Inventors: Jiahui Liang, Sunnyvale, CA (US); Shannon X. Yang, Santa Clara, CA (US); William C. Lukens, San Francisco, CA (US); Mandeep Gill, Cupertino, CA (US); Jeanny Wang, Palo Alto, CA (US); William S. Lee, Fremont, CA (US); Stephen P. Jackson, San Francisco, CA (US); Rex T. Ehman, Cupertino, CA (US); Colin M. Ely, Sunnyvale, CA (US); Nikolas T. Vitt, Sunnyvale, CA (US); Trevor J. Ness, Santa Cruz, CA (US)

(73) Assignee: APPLE INC., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/217,992

(22) Filed: Jul. 3, 2023

(65) Prior Publication Data

US 2023/0350349 A1 Nov. 2, 2023

Related U.S. Application Data

(63) Continuation of application No. 17/741,066, filed on May 10, 2022, now Pat. No. 11,740,591, which is a (Continued)

(51) Int. Cl.
*G04G 21/02* (2010.01)
*G04G 17/08* (2006.01)
(Continued)

(52) U.S. Cl.
CPC ............. *G04G 21/02* (2013.01); *G04G 17/08* (2013.01); *G04G 21/08* (2013.01); *H04R 1/028* (2013.01); *H04R 2201/023* (2013.01)

(58) Field of Classification Search
CPC ........ G04G 21/02; G04G 17/08; G04G 21/08; G04G 17/04; H04R 1/028; H04R 2201/023; H04R 1/2842
See application file for complete search history.

(56) References Cited

U.S. PATENT DOCUMENTS 1,276,708 A 8/1918 Blair
1,646,628 A 10/1927 Nolen
(Continued)

FOREIGN PATENT DOCUMENTS

CN 2831113 10/2006
CN 204104134 1/2015
(Continued)

OTHER PUBLICATIONS

Baechtle et al., "Adjustable Audio Indicator," IBM, 2 pages, Jul. 1, 1984.
(Continued)

*Primary Examiner* — Edwin A. Leon
(74) *Attorney, Agent, or Firm* — Brownstein Hyatt Farber Schreck, LLP

(57) ABSTRACT

An electronic watch may include a housing at least partially defining an interior cavity divided into at least a first volume and a second volume, a pressure-sensing component positioned within the first volume, a speaker positioned within the first volume, a processor positioned within the second volume, a battery positioned within the second volume, and a barometric vent that allows air pressure equalization between the first volume and an external environment.

20 Claims, 13 Drawing Sheets

Related U.S. Application Data continuation of application No. 16/291,216, filed on Mar. 4, 2019, now Pat. No. 11,334,032.

(60) Provisional application No. 62/725,163, filed on Aug. 30, 2018.

(51) Int. Cl.

| | |
|---|---|
| ***G04G 21/08*** | (2010.01) |
| ***H04R 1/02*** | (2006.01) |

(56) References Cited

U.S. PATENT DOCUMENTS

| | | | |
|---|---|---|---|
| 1,893,291 | A | 1/1933 | Kwartin |
| 1,992,605 | A | 2/1935 | Clifford et al. |
| 2,325,688 | A | 7/1943 | Landis |
| 2,779,095 | A | 1/1957 | Hottenroth, Jr. |
| 3,414,689 | A | 12/1968 | Gummel et al. |
| 3,866,299 | A | 2/1975 | Gregg et al. |
| 4,068,103 | A | 1/1978 | King et al. |
| 4,081,631 | A | 3/1978 | Feder |
| 4,089,576 | A | 5/1978 | Barchet |
| 4,095,411 | A | 6/1978 | Kondo |
| 4,132,437 | A | 1/1979 | Green |
| 4,245,642 | A | 1/1981 | Skubitz et al. |
| 4,352,168 | A | 9/1982 | Anderson et al. |
| 4,466,441 | A | 8/1984 | Skubitz et al. |
| 4,658,425 | A | 4/1987 | Julstrom |
| 5,106,318 | A | 4/1992 | Endo et al. |
| 5,293,002 | A | 3/1994 | Grenet et al. |
| 5,335,011 | A | 8/1994 | Addeo et al. |
| 5,341,433 | A | 8/1994 | Meyer et al. |
| 5,406,038 | A | 4/1995 | Reiff et al. |
| 5,521,886 | A | 5/1996 | Hirosawa et al. |
| 5,570,324 | A | 10/1996 | Geil |
| 5,604,329 | A | 2/1997 | Kressner et al. |
| 5,619,583 | A | 4/1997 | Page et al. |
| 5,733,153 | A | 3/1998 | Takahashi et al. |
| 5,879,598 | A | 3/1999 | McGrane |
| 5,958,203 | A | 9/1999 | Parce et al. |
| 5,960,366 | A | 9/1999 | Duwaer |
| 6,036,554 | A | 3/2000 | Koeda et al. |
| 6,073,033 | A | 6/2000 | Campo |
| 6,129,582 | A | 10/2000 | Wilhite et al. |
| 6,151,401 | A | 11/2000 | Annaratone |
| 6,154,551 | A | 11/2000 | Frenkel |
| 6,191,796 | B1 | 2/2001 | Tarr |
| 6,192,253 | B1 | 2/2001 | Charlier et al. |
| 6,317,237 | B1 | 11/2001 | Nakao et al. |
| 6,370,005 | B1 | 4/2002 | Sun et al. |
| 6,373,958 | B1 | 4/2002 | Enomoto et al. |
| 6,385,134 | B1 | 5/2002 | Lange et al. |
| 6,400,825 | B1 | 6/2002 | Miyamoto et al. |
| 6,516,077 | B1 | 2/2003 | Yamaguchi et al. |
| 6,553,126 | B2 | 4/2003 | Han et al. |
| 6,700,987 | B2 | 3/2004 | Kuze et al. |
| 6,754,359 | B1 | 6/2004 | Svean et al. |
| 6,813,218 | B1 | 11/2004 | Antonelli et al. |
| 6,829,018 | B2 | 12/2004 | Lin et al. |
| 6,882,335 | B2 | 4/2005 | Saarinen |
| 6,892,850 | B2 | 5/2005 | Suzuki et al. |
| 6,924,792 | B1 | 8/2005 | Jessop |
| 6,934,394 | B1 | 8/2005 | Anderson |
| 6,942,771 | B1 | 9/2005 | Kayyem |
| 7,003,099 | B1 | 2/2006 | Zhang et al. |
| 7,059,932 | B1 | 6/2006 | Tobias et al. |
| 7,082,322 | B2 | 7/2006 | Harano |
| 7,116,795 | B2 | 10/2006 | Tuason et al. |
| 7,154,526 | B2 | 12/2006 | Foote et al. |
| 7,158,647 | B2 | 1/2007 | Azima et al. |
| 7,181,030 | B2 | 2/2007 | Rasmussen et al. |
| 7,263,373 | B2 | 8/2007 | Mattisson |
| 7,266,189 | B1 | 9/2007 | Day |
| 7,362,877 | B2 | 4/2008 | Honda et al. |
| 7,378,963 | B1 | 5/2008 | Begault et al. |
| 7,414,922 | B2 | 8/2008 | Ferri et al. |
| 7,527,523 | B2 | 5/2009 | Yohn et al. |
| 7,536,029 | B2 | 5/2009 | Choi et al. |
| 7,570,772 | B2 | 8/2009 | Sorensen et al. |
| 7,679,923 | B2 | 3/2010 | Inagaki et al. |
| 7,792,320 | B2 | 9/2010 | Proni |
| 7,867,001 | B2 | 1/2011 | Ambo et al. |
| 7,878,869 | B2 | 2/2011 | Murano et al. |
| 7,903,061 | B2 | 3/2011 | Zhang et al. |
| 7,912,242 | B2 | 3/2011 | Hikichi |
| 7,966,785 | B2 | 6/2011 | Zadesky et al. |
| 8,031,853 | B2 | 10/2011 | Bathurst et al. |
| 8,055,003 | B2 | 11/2011 | Mittleman et al. |
| 8,116,505 | B2 | 2/2012 | Kawasaki-Hedges et al. |
| 8,116,506 | B2 | 2/2012 | Kuroda et al. |
| 8,161,890 | B2 | 4/2012 | Wang |
| 8,204,266 | B2 | 6/2012 | Munoz et al. |
| 8,218,397 | B2 | 7/2012 | Chan |
| 8,226,446 | B2 | 7/2012 | Kondo et al. |
| 8,264,777 | B2 | 9/2012 | Skipor et al. |
| 8,286,319 | B2 | 10/2012 | Stolle et al. |
| 8,331,603 | B2 | 12/2012 | Martenson et al. |
| 8,340,312 | B2 | 12/2012 | Johnson et al. |
| 8,409,417 | B2 | 4/2013 | Wu |
| 8,417,298 | B2 | 4/2013 | Mittleman et al. |
| 8,447,054 | B2 | 5/2013 | Bharatan et al. |
| 8,452,037 | B2 | 5/2013 | Filson et al. |
| 8,488,817 | B2 | 7/2013 | Mittleman et al. |
| 8,508,908 | B2 | 8/2013 | Jewell-Larsen |
| 8,560,309 | B2 | 10/2013 | Pance et al. |
| 8,574,004 | B1 | 11/2013 | Tarchinski et al. |
| 8,620,162 | B2 | 12/2013 | Mittleman |
| 8,632,670 | B2 | 1/2014 | Garimella et al. |
| 8,644,519 | B2 | 2/2014 | Pance et al. |
| 8,644,533 | B2 | 2/2014 | Burns |
| 8,693,698 | B2 | 4/2014 | Carnes et al. |
| 8,724,841 | B2 | 5/2014 | Bright et al. |
| 8,804,993 | B2 | 8/2014 | Shukla et al. |
| 8,811,648 | B2 | 8/2014 | Pance et al. |
| 8,858,271 | B2 | 10/2014 | Yeung et al. |
| 8,879,761 | B2 | 11/2014 | Johnson et al. |
| 8,882,547 | B2 | 11/2014 | Asakuma et al. |
| 8,885,851 | B2 | 11/2014 | Westenbroek et al. |
| 8,983,097 | B2 | 3/2015 | Dehe et al. |
| 8,989,428 | B2 | 3/2015 | Kwong |
| 9,007,871 | B2 | 4/2015 | Armstrong-Muntner |
| 9,042,588 | B2 | 5/2015 | Aase |
| 9,066,172 | B2 | 6/2015 | Dix et al. |
| 9,118,990 | B2 | 8/2015 | Hankey et al. |
| 9,161,434 | B2 | 10/2015 | Merz et al. |
| 9,182,859 | B2 | 11/2015 | Coulson et al. |
| 9,227,189 | B2 | 1/2016 | Sobek et al. |
| 9,229,494 | B2 | 1/2016 | Rayner |
| 9,357,299 | B2 | 5/2016 | Kwong |
| 9,380,369 | B2 | 6/2016 | Utterman et al. |
| 9,386,362 | B2 | 7/2016 | Filson et al. |
| 9,451,354 | B2 | 9/2016 | Zadesky et al. |
| 9,486,823 | B2 | 11/2016 | Andersen et al. |
| 9,497,527 | B2 | 11/2016 | Mittleman et al. |
| 9,774,941 | B2 | 9/2017 | Grinker |
| 9,820,033 | B2 | 11/2017 | Dix et al. |
| 9,838,811 | B2 | 12/2017 | Pelosi |
| 9,854,345 | B2 | 12/2017 | Briggs |
| 9,857,262 | B2 | 1/2018 | Kil et al. |
| 9,888,309 | B2 | 2/2018 | Prelogar et al. |
| 9,900,698 | B2 | 2/2018 | Luzzato et al. |
| 9,955,244 | B2 | 4/2018 | Rothkopf et al. |
| 10,063,951 | B2 | 8/2018 | Filson et al. |
| 10,117,012 | B2 | 10/2018 | Saulsbury et al. |
| 10,165,694 | B1 | 12/2018 | Werner et al. |
| 10,455,311 | B2 | 10/2019 | Magariyachi et al. |
| 10,466,047 | B2 | 11/2019 | Ehman et al. |
| 10,466,961 | B2 | 11/2019 | Yang |
| 10,477,328 | B2 | 11/2019 | Han et al. |
| 10,684,656 | B2 | 6/2020 | MacNeil et al. |
| 10,757,491 | B1 | 8/2020 | Jackson et al. |
| 10,837,772 | B2 | 11/2020 | MacNeil et al. |
| 10,873,798 | B1 | 12/2020 | Jackson et al. |
| 11,307,661 | B2 | 4/2022 | Miller et al. |

(56) References Cited

U.S. PATENT DOCUMENTS

| | | | |
|---|---|---|---|
| 11,334,032 B2 | 4/2022 | Liang et al. | |
| 11,561,144 B1 | 1/2023 | Han et al. | |
| 2003/0087292 A1 | 5/2003 | Chen et al. | |
| 2004/0203520 A1 | 10/2004 | Schirtzinger et al. | |
| 2005/0009004 A1 | 1/2005 | Xu et al. | |
| 2005/0271216 A1 | 12/2005 | Lashkari | |
| 2006/0072248 A1 | 4/2006 | Watanabe et al. | |
| 2006/0233411 A1 | 10/2006 | Utigard | |
| 2007/0012827 A1 | 1/2007 | Fu et al. | |
| 2007/0191719 A1 | 8/2007 | Yamashita et al. | |
| 2008/0037771 A1 | 2/2008 | Black et al. | |
| 2008/0204379 A1 | 8/2008 | Perez-Noguera | |
| 2008/0260188 A1 | 10/2008 | Kim | |
| 2008/0292112 A1 | 11/2008 | Valenzuela et al. | |
| 2008/0292126 A1 | 11/2008 | Sacha et al. | |
| 2008/0310663 A1 | 12/2008 | Shirasaka et al. | |
| 2009/0045005 A1 | 2/2009 | Byon et al. | |
| 2011/0002487 A1 | 1/2011 | Panther et al. | |
| 2011/0211724 A1 | 9/2011 | Hirata | |
| 2011/0219882 A1* | 9/2011 | Nakamura | G04G 17/04 73/756 |
| 2011/0261951 A1 | 10/2011 | Holmes et al. | |
| 2012/0052924 A1 | 3/2012 | Cybart et al. | |
| 2013/0141364 A1 | 6/2013 | Lynn et al. | |
| 2013/0164999 A1 | 6/2013 | Ge et al. | |
| 2013/0280965 A1 | 10/2013 | Kojyo | |
| 2013/0322646 A1 | 12/2013 | Davie et al. | |
| 2014/0022189 A1 | 1/2014 | Sheng et al. | |
| 2014/0143784 A1 | 5/2014 | Mistry et al. | |
| 2014/0250657 A1 | 9/2014 | Stanley et al. | |
| 2015/0002452 A1 | 1/2015 | Klinghult et al. | |
| 2015/0023510 A1 | 1/2015 | Shimizu | |
| 2015/0078611 A1 | 3/2015 | Boozer et al. | |
| 2016/0004311 A1 | 1/2016 | Yliaho et al. | |
| 2016/0055729 A1 | 2/2016 | Maddox et al. | |
| 2016/0150311 A1 | 5/2016 | Bremyer et al. | |
| 2016/0324478 A1 | 11/2016 | Goldstein | |
| 2017/0035156 A1 | 2/2017 | Wright et al. | |
| 2017/0089698 A1* | 3/2017 | Ehman | G01C 5/06 |
| 2017/0094386 A1 | 3/2017 | Trainer et al. | |
| 2017/0169673 A1 | 6/2017 | Billington et al. | |
| 2017/0180850 A1 | 6/2017 | Hsu et al. | |
| 2017/0303048 A1 | 10/2017 | Hooton et al. | |
| 2017/0347179 A1 | 11/2017 | Masaki et al. | |
| 2018/0063981 A1 | 3/2018 | Park et al. | |
| 2019/0037293 A1 | 1/2019 | Kim | |
| 2020/0075272 A1 | 3/2020 | Solis et al. | |
| 2020/0100013 A1 | 3/2020 | Harjee et al. | |
| 2020/0107110 A1 | 4/2020 | Ji et al. | |
| 2020/0266845 A1 | 8/2020 | Kumar et al. | |
| 2020/0344536 A1 | 10/2020 | Jackson et al. | |
| 2022/0214751 A1 | 7/2022 | Miller et al. | |
| 2022/0269221 A1 | 8/2022 | Liang et al. | |
| 2022/0286539 A1 | 9/2022 | Stobbe et al. | |
| 2023/0345155 A1 | 10/2023 | Jackson et al. | |

FOREIGN PATENT DOCUMENTS

| | | |
|---|---|---|
| CN | 016415411 | 2/2017 |
| CN | 107677538 | 2/2018 |
| DE | 3009624 | 3/1980 |
| EP | 2094032 | 8/2009 |
| GB | 2310559 | 8/1997 |
| GB | 2342802 | 4/2000 |
| JP | S566190 | 1/1981 |
| JP | 2102905 | 4/1990 |
| JP | 2003319490 | 11/2003 |
| JP | 2004153018 | 5/2004 |
| JP | 2006297828 | 11/2006 |
| JP | 2016095190 | 5/2016 |
| JP | 2018050141 | 3/2018 |
| KR | 20100105004 | 9/2010 |
| KR | 20190107490 | 9/2019 |
| KR | 20200026000 | 3/2020 |
| WO | WO03/049494 | 6/2003 |
| WO | WO04/025938 | 3/2004 |
| WO | WO2007/083894 | 7/2007 |
| WO | WO08/153639 | 12/2008 |
| WO | WO2009/017280 | 2/2009 |
| WO | WO2011/057346 | 5/2011 |
| WO | WO2011/061483 | 5/2011 |
| WO | WO2016/190957 | 12/2016 |
| WO | WO2018/135849 | 7/2018 |

OTHER PUBLICATIONS

Blankenbach et al., "Bistable Electrowetting Displays," https://spie.org/x43687.xml, 3 pages, Jan. 3, 2011.

Enns, Neil, "Touchpad-Based Remote Control Devices," University of Toronto, 1998.

Min-soo, Kim, "Apple iPhone 12 'notch' disappearing . . . New Face ID Test," https://nocutnews.co.kr/news/5232116, 5 pages, Oct. 23, 2019.

Pingali et al., "Audio-Visual Tracking for Natural Interactivity," Bell Laboratories, Lucent Technologies, pp. 373-382, Oct. 1999.

Valdes et al., "How Smart Watches Work," https://electronics.howstuffworks.com/gadgets/clocks-watches/smart-watch2.htm, 10 pages, Apr. 2005.

Zhou et al., "Electrostatic Graphene Loudspeaker," Applied Physics Letters, vol. 102, No. 223109, 5 pages, Dec. 6, 2012.

* cited by examiner

ELECTRONIC WATCH WITH BAROMETRIC VENT

CROSS-REFERENCE TO RELATED APPLICATION

This application is a continuation patent application of U.S. patent application Ser. No. 17/741,066, filed May 10, 2022 and titled "Electronic Watch with Barometric Vent," which is a continuation patent application of U.S. patent application Ser. No. 16/291,216, filed Mar. 4, 2019 and titled "Electronic Watch with Barometric Vent," now U.S. Pat. No. 11,334,032, which is a nonprovisional patent application of and claims the benefit of U.S. Provisional Patent Application No. 62/725,163, filed Aug. 30, 2018 and titled "Electronic Watch with Barometric Vent," the disclosures of which are hereby incorporated herein by reference in their entireties.

FIELD

The described embodiments relate generally to electronic devices, and more particularly to electronic devices with sensors requiring exposure to an external environment.

BACKGROUND

Electronic devices use all manner of components to gather information about the surrounding environment, and to provide outputs to users of the devices. In some cases, the components require exposure to the surrounding environment in order to function effectively. For example, a temperature sensor may need to be exposed to the surrounding environment in order to accurately detect an ambient air temperature, and a speaker may need to be exposed to the surrounding environment in order to be effectively heard by a user. Electronic devices may also benefit from environmental sealing, such as waterproofing, to help prevent damage to sensitive electrical components and circuits. Sealing a device, however, may interfere with the operation of components that rely on exposure to the surrounding environment to function properly.

SUMMARY

An electronic watch may include a housing at least partially defining an interior cavity divided into at least a first volume and a second volume, a pressure-sensing component positioned within the first volume, a speaker positioned within the first volume, a processor positioned within the second volume, a battery positioned within the second volume, and a barometric vent that allows air pressure equalization between the first volume and an external environment.

The speaker may include a speaker diaphragm defining a first opening, and the electronic watch may further include an internal member that divides the interior cavity into the first volume and the second volume and defines a second opening fluidly coupling the first volume and the second volume. The speaker diaphragm may be positioned over the second opening, and the first and second openings may define the barometric vent.

The speaker diaphragm may be waterproof. The housing may define a third opening fluidly coupling the interior cavity to the external environment, and the speaker may be configured to produce a sound to eject liquid from the first volume through the third opening.

The electronic watch may further include a band coupled to the housing and configured to couple the watch to a wearer, a transparent cover coupled to the housing, a touch sensor positioned below the transparent cover and configured to detect touch inputs applied to the transparent cover, and a crown positioned along a side surface of the housing and configured to receive rotational inputs.

The electronic watch may further include an internal member that divides the interior cavity into the first volume and the second volume and defines a second opening fluidly coupling the first volume and the second volume, and the barometric vent may include an air-permeable waterproof membrane positioned over the second opening.

An electronic watch may include a housing at least partially defining an interior cavity, a display positioned at least partially within the housing and configured to display a graphical output, a transparent cover coupled to the housing, a touch sensor positioned below the transparent cover and configured to detect touch inputs applied to the transparent cover, and an internal member that divides the interior cavity into a first volume and a second volume. A first opening in the housing may expose the first volume to an external environment, and a second opening in the internal member may allow gases to pass between the first volume and the second volume.

The electronic watch may further include a pressure-sensing component positioned within the first volume and a speaker positioned within the first volume. The electronic watch may further include a waterproof membrane covering the second opening. The speaker may include a diaphragm configured to produce sound output, and the diaphragm may be the waterproof membrane. The diaphragm may define an opening that allows passage of air while preventing passage of water.

The electronic watch may include a liquid sensing element positioned within the first volume and configured to detect the presence of liquid within the first volume. After the liquid sensing element detects the presence of liquid within the first volume, the speaker may produce a sound to eject liquid from the first volume.

A wearable electronic device includes a housing at least partially defining an interior cavity divided into a first volume and a second volume, a processor positioned within the second volume, a pressure-sensing component positioned within the first volume, and a speaker positioned within the first volume. The housing may define an opening that allows air pressure equalization between the first volume and an external environment.

The opening may be a first opening, the first opening may allow sound output from the speaker to exit the housing and allows the pressure-sensing component to determine a barometric pressure of the external environment, the wearable electronic device may further include an internal member that divides the housing into the first volume and the second volume, and the internal member may define a second opening that allows air pressure equalization between the first volume and the second volume. The speaker may include a diaphragm that is positioned over the second opening, the diaphragm may define a third opening, and the second opening and the third opening may cooperate to define an air passage between the first volume and the second volume.

The wearable electronic device may further include a band coupled to the housing and configured to couple the wearable electronic device to a wearer, a transparent cover coupled to the housing, a touch sensor positioned below the transparent cover and configured to detect touch inputs applied to the transparent cover, and a crown positioned along a side surface of the housing and configured to receive rotational inputs.

The housing may further define a capillary passage fluidly coupling the first volume to the external environment and configured to draw a liquid out of the first volume. The housing may define a channel configured to receive at least a portion of a band, and the capillary passage may extend from a surface of the channel to a surface of the first volume. The wearable electronic device may further include a transparent cover coupled to a front of the housing, a display positioned below the transparent cover and configured to display a graphical output, and a back cover coupled to a back of the housing and at least partially defining an interstitial space between a portion of the back cover and a portion of a surface of the housing. The capillary passage may extend from a surface of the first volume to the portion of the surface of the housing.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
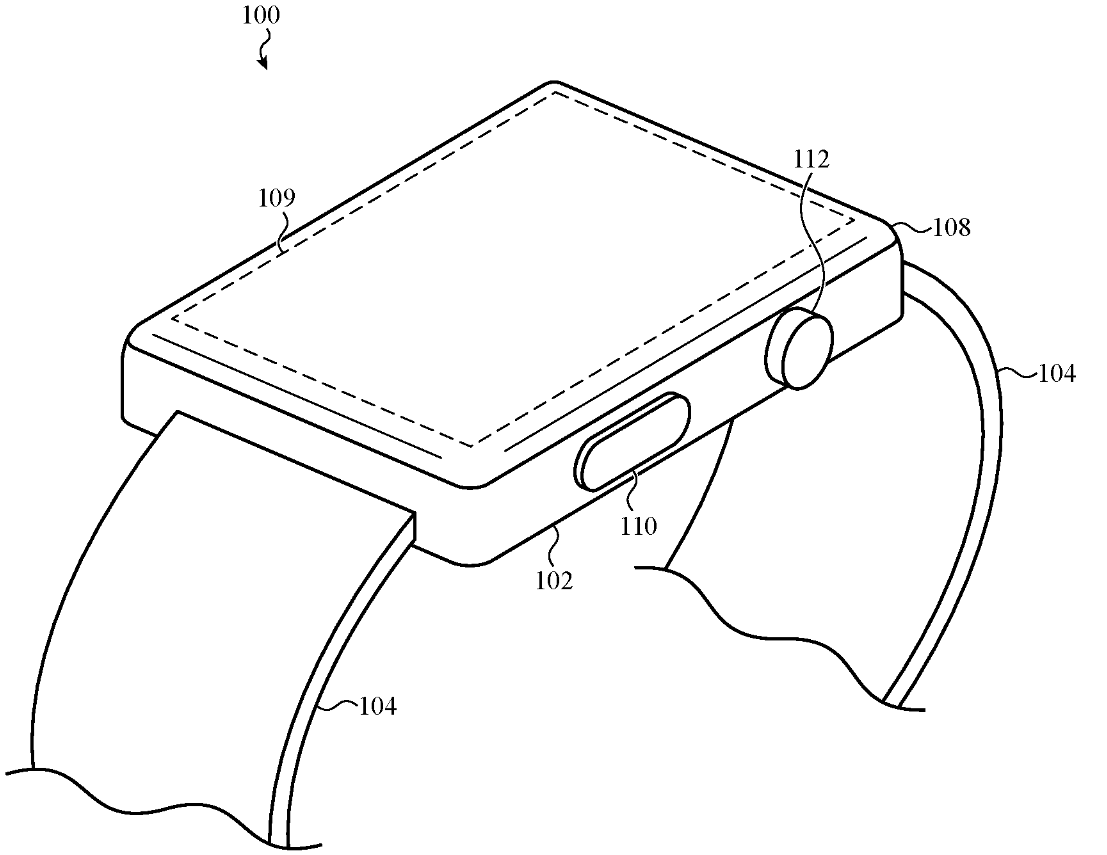
FIGS. 1A-1B depict an example wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

In conventional portable electronic devices, components such as batteries, processors, displays, electrical contacts (e.g., for electromechanical buttons), touch sensors, and the like may need to be protected from water, dust, debris, or other contaminants to prevent damage. Thus, these components may be positioned in a waterproof housing or a waterproof portion of a housing. In some cases, however, electronic devices as described herein may include components that require or otherwise benefit from direct access to the external environment. For example, a wearable electronic device, such as an electronic watch (also referred to as a “smart watch”), may include a barometric pressure sensor, a speaker, a microphone, a temperature sensor, or the like. Each of these devices may advantageously be exposed, at least partially, to the external, ambient air. For example, in the case of a barometric pressure sensor, if accurate sensor readings for the ambient environment are desired, the pressure sensor needs to be exposed to ambient air and not in a sealed chamber that could have a different internal pressure. Similarly, a speaker that is intended to produce audible output to a user of an electronic device may be more effective and have better acoustic properties if the speaker has a substantially open path to the ambient air. Temperature sensors, microphones, or the like may similarly benefit from substantially direct access to the external environment.

Also, while it may be desirable to seal a portion of a housing to provide a waterproof chamber for processors, circuitry, and the like, a seal that prevents the passage of air into the sealed portion may present other drawbacks. For example, differences in pressure between the ambient air and the sealed portion of the housing due to changes in barometric pressure (e.g., from changes in weather or a wearer moving to a higher elevation) could damage the device. A higher internal pressure relative to the ambient pressure, for example, may stress the seals or even cause the housing to break open.

The instant embodiments relate to an electronic device in which an interior cavity of a housing is divided into different volumes. A first volume in the interior cavity may be substantially open to the external environment, such as through an opening in a wall of the housing. Components that require or benefit from free access to the ambient air, such as barometric pressure sensors, speakers, thermometers, and the like, may be positioned in the first volume. Through the opening, air may easily move between the first volume and the external environment, thus allowing these components to function as desired. A second volume in the interior cavity may be substantially waterproof, and may contain processors, batteries, circuitry, and other electronic components. In order to allow pressure equalization between the second volume and the ambient air, the device may include a barometric vent that is configured to allow pressure equalization between the first and second volumes. The barometric vent may include an opening that fluidly couples the first and second volumes, as well as an air-permeable, waterproof membrane positioned over the opening. This configuration may allow air pressure equalization between the interior cavity of the device and the external environment, and may also prevent water from entering the second volume. By defining different volumes within the interior cavity of a housing, different degrees of environmental access and/or sealing are provided for the different components of the device.

In some cases, multiple components that benefit from access to ambient air are positioned in the first volume. For example, in some cases a speaker and a pressure sensor (or a pressure-sensing component of a pressure sensor) are positioned in a single, shared volume. By using a shared volume, the amount of empty space around the components may be greater than if each component were each positioned in a separate volume. The greater amount of empty space in the volume may help prevent or reduce water retention within the volume, as smaller volumes with less distance between their walls or boundary features may produce a capillary effect that causes water to be drawn into or retained in the volume (which may negatively affect the operation of speakers, pressure sensors, microphones, and the like). Further, by positioning multiple components in a single ambient-air-accessible volume, water ejection systems and techniques can be shared among the multiple components. Example water ejection systems and techniques may include, for example, capillary-action drains, speaker-driven water ejection, or the like.

Figure 1B:
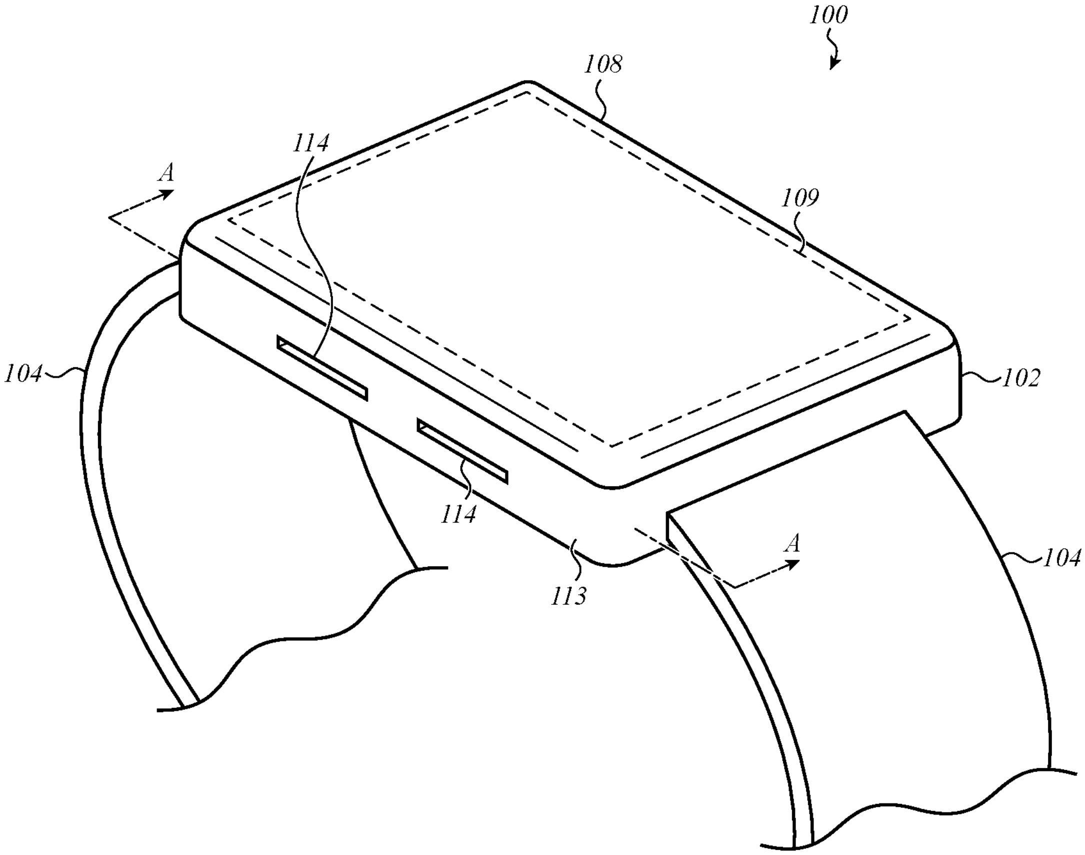

FIGS. 1A-1B depict an electronic device 100. The electronic device 100 is depicted as an electronic watch (e.g., a smart watch), though this is merely one example embodiment of an electronic device and the concepts discussed herein may apply equally or by analogy to other electronic devices, including mobile phones (e.g., smartphones), tablet computers, notebook computers, head-mounted displays, digital media players (e.g., mp3 players), or the like.

The electronic device 100 includes a housing 102 and a band 104 coupled to the housing 102. The band 104 may be configured to attach the electronic device 100 to a user, such as to the user's arm or wrist. A portion of the band 104 may be received in a channel that extends along an exterior side of the housing 102, as described herein. The band 104 may be secured to the housing 102 within the channel to maintain the band 104 to the housing 102.

The electronic device 100 also includes a transparent cover 108 (also referred to simply as a "cover") coupled to the housing 102. The cover 108 may define a front face of the electronic device 100. For example, in some cases, the cover 108 defines substantially the entire front face and/or front surface of the electronic device 100. The cover 108 may also define an input surface of the device 100. For example, as described herein, the device 100 may include touch and/or force sensors that detect inputs applied to the cover 108. The cover 108 may be formed from or include glass, sapphire, a polymer, a dielectric, or any other suitable material.

The cover 108 may cover at least part of a display 109 that is positioned at least partially within the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid-crystal display (LCD), organic light emitting diode display (OLED), or any other suitable components or display technology.

The display 109 may include or be associated with touch sensors and/or force sensors that extend along the output region of the display and which may use any suitable sensing elements and/or sensing techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 6.

The electronic device 100 also includes a crown 112 having a cap, head, protruding portion, or component(s) or feature(s) positioned along a side surface of the housing 102. At least a portion of the crown 112 may protrude from the housing 102, and may define a generally circular shape or a circular exterior surface. The exterior surface of the crown 112 may be textured, knurled, grooved, or may otherwise have features that may improve the tactile feel of the crown 112 and/or facilitate rotation sensing.

The crown 112 may facilitate a variety of potential user interactions. For example, the crown 112 may be rotated by a user (e.g., the crown may receive rotational inputs). Rotational inputs of the crown 112 may zoom, scroll, rotate, or otherwise manipulate a user interface or other object displayed on the display 109 (among other possible functions). The crown 112 may also be translated or pressed (e.g., axially) by the user. Translational or axial inputs may select highlighted objects or icons, cause a user interface to return to a previous menu or display, or activate or deactivate functions (among other possible functions). In some cases, the device 100 may sense touch inputs or gestures applied to the crown 112, such as a finger sliding along a surface of the crown 112 (which may occur when the crown 112 is configured to not rotate) or a finger touching an end face of the crown 112. In such cases, sliding gestures may cause operations similar to the rotational inputs, and touches on an end face may cause operations similar to the translational inputs. As used herein, rotational inputs include both rotational movements of the crown (e.g., where the crown is free to rotate), as well as sliding inputs that are produced when a user slides a finger or object along the surface of a crown in a manner that resembles a rotation (e.g., where the crown is fixed and/or does not freely rotate).

The electronic device 100 may also include other inputs, switches, buttons, or the like. For example, the electronic device 100 includes a button 110. The button 110 may be a movable button (as depicted) or a touch-sensitive region of the housing 102. The button 110 may control various aspects of the electronic device 100. For example, the button 110 may be used to select icons, items, or other objects displayed on the display 109, to activate or deactivate functions (e.g., to silence an alarm or alert), or the like.

FIG. 1B depicts another view of the electronic device 100. As shown, the housing 102 may include a side wall 113, which may define one or more exterior side surfaces of the housing 102 (and thus of the device 100). In some cases, the side wall 113 extends around the entire periphery of the device. As described herein, the side wall 113 may at least partially define an interior cavity of the housing 102.

The side wall 113 may define openings 114. While multiple openings 114 are shown, the side wall 113 may have more or fewer openings than shown, such as a single opening 114, or three, four, or more openings 114. Further, while the device 100 shows the openings 114 in the side wall 113, they may be positioned elsewhere, such as through a back or bottom wall of the device 100.

As described in more detail herein, the openings 114 may open to a first volume within the housing 102, in which components such as a pressure-sensing component and a speaker are positioned. The openings 114 may allow air pressure equalization between the first volume and the external environment around the device 100, thus allowing the internal pressure-sensing component to achieve accurate readings of the ambient air pressure. The openings 114 may also allow sound output from an internal speaker to exit the housing, such that sound output from the speaker can be heard by a wearer and/or other observers. In some cases, the openings 114 are completely open, with no screen, mesh, grate, or other component or material obstructing air flow between the first volume. In other cases, the openings 114 may be covered by a screen, mesh, grate, or other component or material, which may help prevent debris, dust, or other contaminants from entering the housing 102.

Figure 2A:
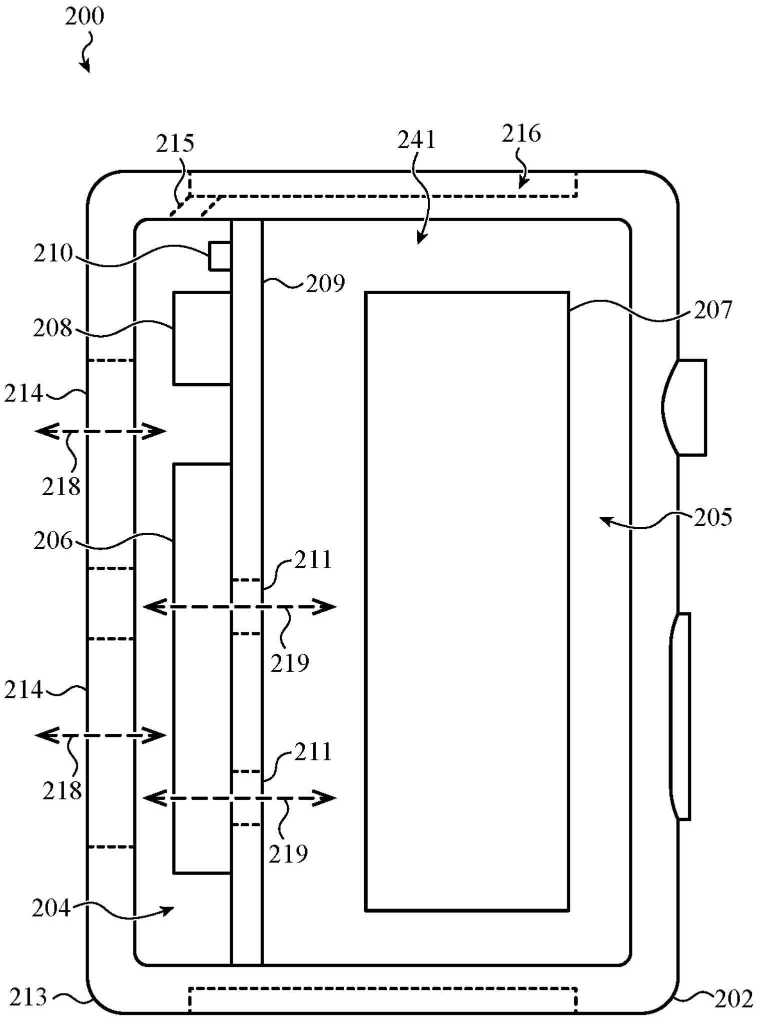
FIG. 2A depicts a partial view of another example wearable electronic device.

FIG. 2A shows a portion of an electronic device 200 with a cover (e.g., the cover 108) removed, showing an example arrangement of components within an interior cavity 241 of the device. The device 200 may be an embodiment of the device 100, and may include the same or similar components and may provide the same or similar functions as the device 100. Accordingly, details of the device 100 described above may apply to the device 200, and for brevity will not be repeated here.

The electronic device 200 may include a housing 202 with a side wall 213. The side wall 213 may at least partially define the interior cavity 241 of the device 200. The interior cavity 241 may be divided into a first volume 204 and a second volume 205 by an internal member 209. The internal member 209 may be integral with the housing 202, or it may be a separate component (e.g., a circuit board, a brace, a flexible circuit material, a membrane, or the like). As shown, the internal member 209 is a straight component, but it may have any suitable shape or configuration. Further, the shape, size, and overall configuration of the first and second volumes 204, 205 shown in FIG. 2A are illustrative examples, and other shapes, sizes, or overall configurations of the first and second volumes are also contemplated.

Components 207 may be positioned in the second volume 205. The components 207 may include processors, memory, batteries, haptic output devices, circuit boards, sensors, display components, or the like. For ease of illustration the components 207 are shown in a generalized shape and location, though one of ordinary skill in the art will recognize that they may have a different shape or overall configuration, and they may be positioned in or otherwise incorporated with the housing 202 in any suitable way.

Components that benefit from direct air access to the external environment may be positioned in the first volume 204. For example, as shown in FIG. 2A, a pressure-sensing component 208 and a speaker 206 may be positioned within the first volume 204. The pressure-sensing component 208 and the speaker 206 may be coupled to the internal member 209. In some cases, the internal member 209, the speaker 206, and the pressure-sensing component 208 (and optionally other components or modules) form a modular unit or assembly that may be assembled or built and then subsequently attached to the housing 202. For example, the internal member 209 may be a bracket (which may be a single component or a multi-component assembly) that is configured to be fastened or otherwise secured to the housing 202. The internal member 209 may include a circuit board to which components such as the speaker 206 and the pressure-sensing component 208 may be electrically (and optionally mechanically) coupled. One or more interconnects, wires, cables, flex circuits, or other conductive elements may be coupled to the circuit board, and/or to the electronic components themselves, and may connect to other components (e.g., a processor, a main logic board, etc.) within the electronic device. After the speaker 206, the pressure-sensing component 208, and any other desired components are attached to the internal member 209, the assembly may be placed in the housing 202 and secured to the housing (e.g., via threaded fasteners, adhesives, mechanical interlocks, rivets, or any other suitable fastening or securing component(s) or technique(s)).

The device 200 may also include a liquid-sensing element 210 positioned within the first volume 204. As described herein, the liquid-sensing element 210 (in conjunction with processors, circuitry, or other components that, together with the liquid-sensing element 210, make up a liquid sensor) may detect the presence of liquid (e.g., water, sweat, etc.) within the first volume 204, and may cause the device 200 to take actions to eject the liquid or to otherwise operate differently due to the presence of the liquid. Components within the first volume 204 may be electrically coupled (or otherwise communicatively coupled) to components within the second volume 205 via wires, traces, flex circuits, or other conductors or conduits. Accordingly, the components in the first and second volumes 204, 205 may communicate with one another and cooperate without regard to their different positions within the housing 202. The electrical or communicative couplings may be substantially waterproof and/or impermeable to liquids or gasses.

The housing 202 may include openings 214 (which may be the same as or similar to the openings 114, FIG. 1B) in a side wall 213 of the housing 202. The openings 214 may expose a volume inside the housing 202 to an external environment, thus allowing air pressure equalization between the first volume 204 and the external environment (e.g., the ambient air around the device 200). For example, the openings 214, which may be through-holes in the side wall 213, may allow air flow into and out of the first volume 204, as illustrated by arrows 218. In this way, the air pressure in the first volume 204 may remain substantially the same as the ambient barometric air pressure, thus allowing the pressure-sensing component 208 (in conjunction with processors, memory, circuitry, or other components that, with the pressure-sensing component 208, make up a pressure sensor) to detect a barometric pressure of the ambient air around the device 200, despite the pressure-sensing component 208 being substantially contained inside the housing 202. The openings 214 may be configured to have a size and/or shape that allows air pressure equalization between the first volume 204 and the external environment in a substantially real-time basis. For example, if the openings 214 were too small or were obstructed with a membrane, it may take minutes or even hours for the pressures to equalize, which would lead to inaccurate barometric pressure readings. Accordingly, the openings 214 may be configured to allow air to flow at a flow rate (e.g., volumetric flow rate, mass flow rate) that allows changes in ambient barometric pressure to be reflected substantially immediately within the first volume 204 (e.g., within 1 second or less). In some cases, the openings 214 may have a total opening area of about 2.0 $mm^2$, 2.5 $mm^2$, 3.0 $mm^2$, 3.5 $mm^2$, or 4.0 $mm^2$. In some cases the opening area may be smaller or larger (e.g., below 2.0 $mm^2$ or above 4.0 $mm^2$).

The same openings 214 that expose the first volume 204 to the external environment, as described above, also benefit other components within the first volume 204. For example, the speaker 206 operates by moving air to produce sound. If the speaker 206 were placed in an air-sealed or fully enclosed volume, sound waves produced by the speaker 206 may be inaudible or otherwise muted. By placing the speaker 206 in the first volume 204 (which is exposed to the external environment by the openings 214), sound output from the speaker 206 can exit the housing 202 and be heard by a wearer of the device or other nearby person(s). In some cases, the total opening area of the openings 214, as well as the shape of the openings 214, may be configured to provide a desired acoustic performance. For example, the openings 214 may have a shape that is configured to attenuate a volume of the speaker 206 by less than a target amount (e.g., less than about −5 dB, about −3 dB, about −2 dB, or about −1 dB).

As noted above, the housing 202 is divided into a first volume 204 and a second volume 205. The first volume 204, described above, is exposed to the external environment via openings 214. Due to the need to allow substantially free flow of air into and out of the first volume 204, the openings 214 may not be waterproof. Thus, when the device 200 is exposed to water, sweat, or other liquids (e.g., due to the device 200 being worn while swimming, showering, exercising, in the rain, or the like), those liquids may enter the first volume 204. While components such as the speaker 206 and the pressure-sensing component 208 may tolerate exposure to such liquids, other components of the device 200, such as processors, batteries, displays, etc., may not tolerate such exposure well. Nevertheless, it may not be feasible to fully seal the second volume 205, as changes in barometric pressure could cause damage to fully sealed volumes. For example, pressure differentials between the internal volume and the external environment may cause seals or adhesives to fail, cause cover glasses to be forced away from housings, or the like. Accordingly, one or more openings may be defined between the first volume 204 and the second volume 205 to allow air to pass between the first and second volumes 204, 205 thereby equalizing air pressure between the second volume 205 and the external environment. These openings (e.g., the openings 211, described herein) may be referred to as pressure equalization valves or openings, and they may operate as or be a part of a barometric vent.

Figure 2B:
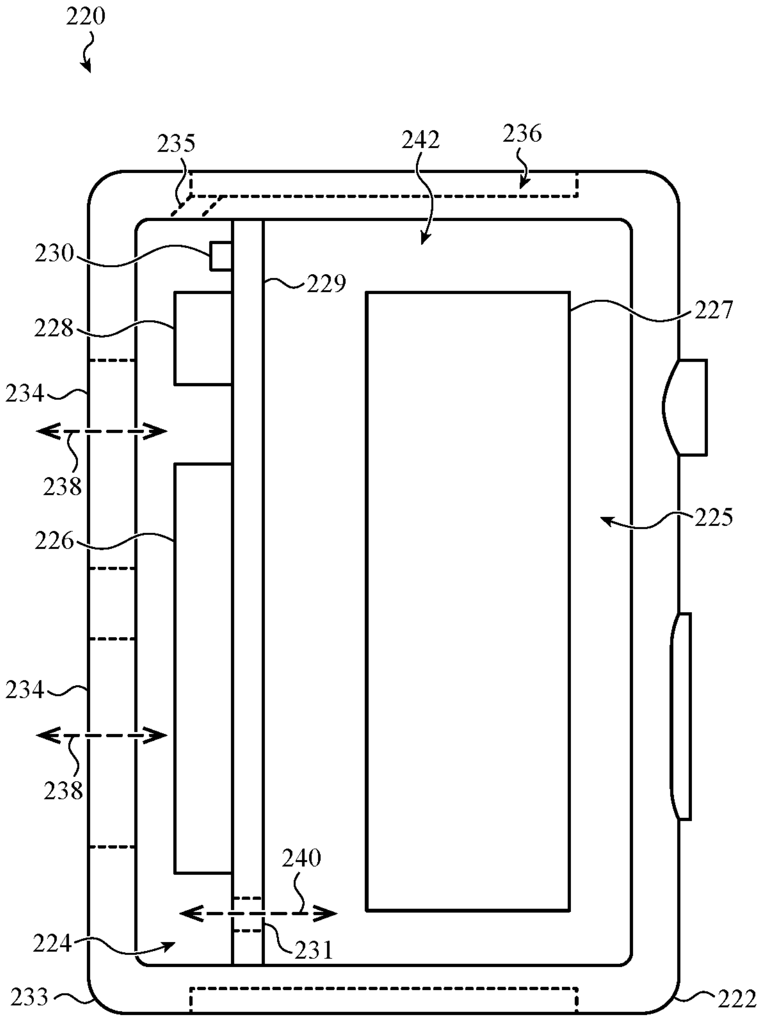
FIG. 2B depicts a partial view of another example wearable electronic device.

FIG. 2A shows example openings 211 between the first volume 204 and the second volume 205. As shown, the openings 211 extend through the internal member 209, and allow air (and/or other gasses) to flow between the first and second volumes 204, 205. In other instances, the openings may extend through a different component or otherwise be located or configured differently than the openings 211, so long as the openings allow air pressure equalization between the first and second volumes 204, 205. As shown, the speaker 206 is positioned over the openings 211. Accordingly, the speaker 206 may also include openings that allow air to flow therethrough (e.g., openings 404, FIG. 4), thus cooperating with the openings 211 to define an air passage, illustrated by arrows 219, between the first and second volumes. As described herein with respect to FIGS. 2A and 4, the openings 211 in the speaker 206 may be openings in a speaker diaphragm. As described herein, the openings 211 and the speaker diaphragm (and/or the openings in the speaker diaphragm) may operate as a barometric vent. In other examples, a barometric vent may include more or different components or features, such as a dedicated air-permeable waterproof membrane (as shown in FIG. 2B), a valve, a seal, additional or different openings that allow fluid communication between the first and second volumes, or the like.

The positioning of the speaker 206 over the openings 211 further allows the second volume 205 to act as a back volume for the speaker 206. For example, when the diaphragm of the speaker 206 moves to generate sound output, changing air pressure behind the speaker 206 due to the movement of the diaphragm (e.g., between the speaker 206 and the internal member 209) may negatively affect the operation of the speaker 206. The openings 211 may alleviate or reduce the pressure variations by allowing air to flow into and out of the second volume 205 during operation of the speaker 206. In this way, a separate speaker back-volume does not need to be defined in order to achieve satisfactory operation of the speaker 206.

As noted above, it may be necessary or desirable to make the second volume 205 resistant to water or liquid ingress. Accordingly, the openings 211 may have a waterproofing membrane, seal, or other component that allows passage of air while limiting or preventing the passage of water. In some cases, the openings in the speaker 206 (e.g., openings in a speaker diaphragm) are sufficiently small to limit or prevent the passage of water. Accordingly, the speaker 206 (or the diaphragm of the speaker 206) may act as an air-permeable waterproof membrane over the openings 211. In other cases, instead of or in addition to using the speaker diaphragm as an air-permeable waterproof membrane, another waterproof membrane may be positioned over the openings 211.

As used herein, an air-permeable waterproof membrane may correspond to any suitable material, component, device, assembly, or the like, that allows air (or other gasses) to pass therethrough, while preventing or limiting the passage of water (or other liquids) under a range of operating conditions for the device. For example, an air-permeable waterproof membrane may be waterproof up to a certain amount of fluid pressure or depth of immersion, beyond which the membrane may rupture or allow water to pass through. In the case of a wearable electronic device, such as a smart watch, the membrane may be waterproof up to an immersion depth of about 10 meters, about 20 meters, about 50 meters, about 100 meters, about 300 meters, or the like. The membrane may be any suitable component or material, such as a perforated metal, a perforated rigid polymer, a polymer film (e.g., expanded polytetrafluoroethylene, polyurethane, or the like), or the like.

The multi-volume configuration of the device 200 also provides a staged sealing configuration that may improve the overall sealing and performance of the device 200. For example, the configuration of the openings 214 (and the housing 202 and the first volume 204 more generally) may allow air to pass into the first volume 204 while preventing water from entering the first volume 204 under non-submerged exposure conditions (e.g., drips or splashes due to sweat, hand washing, rain, etc.). Thus, the first volume 204 may help reduce the amount of water that is proximate to the pressure equalization openings between the first and second volumes 204, 205. This may help improve the waterproof sealing of the second volume 205, as the amount of water that comes into contact with the waterproof seal between the first volume 204 and the second volume 205 is exposed to less water than would be the case if the waterproof seal were exposed directly to the external environment.

As noted above, water and other liquids may be able to enter into the first volume 204 via the openings 214. While water or other liquids may not permanently damage the speaker 206 and the pressure-sensing component 208, those components may not operate properly when there is liquid in the first volume 204. For example, the presence of liquid may interfere with the sound output from the speaker 206 and may cause incorrect pressure readings by the pressure-sensing component 208. Accordingly, the device 200 may use both passive and active techniques to eject or draw water out of the first volume 204.

One active technique for ejecting or purging liquid from the first volume 204 includes using the speaker 206 to produce a sound output (or otherwise move or introduce a pressure or force within the first volume 204) that forces water out of the openings 214. The output from the speaker 206 may be any suitable output, such an inaudible pulsing, vibration, oscillation, or other motion of the diaphragm. In some cases, the output may be audible, and may be a tone of constant pitch and volume, or variable pitch and/or volume (e.g., a pulsing tone). The movement of the speaker 206, and more particularly the diaphragm of the speaker, may effectively push water out of the openings 214. This may result not only in clearing water away from the speaker 206, but also away from the pressure equalization openings (which may be integrated with the speaker, as shown in FIG. 2A, or positioned elsewhere in the first volume as shown in FIG. 2B), and the pressure-sensing component 208. Thus, by positioning multiple components in a single volume, a single water ejection technique may be used to clear water away from multiple different components.

An active liquid-ejection technique as described above may be initiated manually (e.g., by a user initiating a water ejection function) or automatically. In the latter case, a water or liquid-sensing element 210 positioned within the first volume 204 (and optionally coupled to the internal member 209 and forming part of the same assembly as the speaker 206 and the pressure-sensing component 208) detects the presence of liquid in the first volume 204 and automatically initiates the water ejection function. In some cases, the presence of liquid will cause the device to prompt a user (e.g., via the display 109) to initiate the water ejection function.

Instead of or in addition to the active, speaker-based water ejection technique, the device 200 may include other water removal structures. For example, as shown in FIG. 2A the housing 202 may define a capillary passage 215 that fluidly couples the first volume 204 to the external environment. The capillary passage 215 may have a size and shape that produces a capillary action that tends to draw liquid from the first volume 204 into the capillary passage 215. In this way, the capillary passage 215 may act as a passive pump that extracts liquid from the first volume 204. The capillary passage 215 may have a diameter of about 2.0 mm, about 1.5 mm, about 1.0 mm, about 0.6 mm, about 0.5 mm, about 0.4 mm, about 0.25 mm, or any other suitable diameter. The capillary passage 215 may have a diameter within a range of about 0.2 mm to about 2.0 mm, about 0.5 mm to about 1.5 mm, about 0.6 to about 1.2 mm, or any other suitable range.

The capillary passage 215 may have any suitable length. In some cases, the capillary passage 215 may be formed at a non-perpendicular angle relative to a plane defined by the housing wall through which the capillary passage 215 is formed, allowing the capillary passage 215 to have a length that is greater than the thickness of the housing wall. In some cases, a greater length of the capillary passage 215 results in improved water draining performance as compared to a shorter length, due to factors such as a greater water-holding volume in the capillary passage 215.

The walls of the capillary passage 215 may be treated to increase or improve the capillary action. For example, the walls of the capillary passage 215 may be treated (e.g., ground, smoothed, polished, coated), which may increase the effectiveness of the capillary action (e.g., to draw more water away from the first volume 204, and/or to draw the water away faster). For example, an hydrophilic coating may be applied to the interior surfaces of the capillary passage 215 (and/or to the areas of the housing walls adjacent the apertures that define the capillary passage 215) to help draw water and/or other liquids near and ultimately into the capillary passage 215.

The capillary passage 215 may be defined at least in part by a first aperture along an interior surface of the housing 202 (e.g., a first end or opening of the capillary passage 215), and a second aperture along an exterior surface of the housing (e.g., a second end or opening of the capillary passage 215). In some cases, the second aperture opens into a channel 216 in the housing 202 of the device 200. The channel 216 may be configured to receive at least a portion of a band (e.g., the band 104, FIGS. 1A-1B) therein. As described herein with respect to FIG. 5A, the interstitial space between the band and the channel 216 may cooperate with the capillary passage 215 to draw water or other liquids out of the first volume 204.

The capillary passage 215 may also serve as another conduit between the first volume 204 and the external environment, in addition to the openings 214. This may help ensure air pressure equalization between the first volume 204 and the external environment (e.g., the ambient air around the device 200), even if the openings 214 are occluded. For example, under certain conditions a user's wrist, clothing, gloves, or other object may cover the openings 214, particularly as a user's wrist may be rotated in a manner which causes one or more of the openings 214 to be occluded or blocked. This may affect the accuracy of the pressure readings of the pressure-sensing component 208, such as by increasing the pressure in the first volume 204 above the ambient air pressure and/or by preventing air pressure equalization with the external environment. By providing another opening between the external environment and the first volume 204, the air pressure may be able to equalize despite the openings 214 being covered. Having multiple openings (e.g., the capillary passage 215) also allows pressure relief during draining or ejection of water or other liquids. For example, if water is being drained from the first volume 204 via the capillary passage 215, air can enter the first volume 204 through the openings 214 to allow the water to flow freely (without drawing a vacuum within the first volume 204). Similarly, if water is being expelled or drained from the openings 214, air may be able to enter the first volume 204 through the capillary passage 215. Accordingly, when multiple openings are provided, one or more of the openings may act as a pressure equalization vent (also optionally referred to as a breather vent) during liquid draining.

FIG. 2B shows a portion of another electronic device 220 with a cover removed, showing another example arrangement of components within an interior cavity 242 of the device. The device 220 may be an embodiment of the devices 100, 200, and may include the same or similar components and may provide the same or similar functions as those devices. Accordingly, details of the devices 100, 200 described above may apply to the device 220, and for brevity will not be repeated here.

The electronic device 220 may include a housing 222 with a side wall 233. The side wall 233 may at least partially define the interior cavity 242 of the device 220. The interior cavity 242 may be divided into a first volume 224 and a second volume 225. The interior cavity 242 may be divided into the first and second volumes 224, 225 by an internal member 229. The housing 222 may define a capillary passage 235 that fluidly couples the first volume 224 to the external environment. The capillary passage 235 may open to a channel 236 in the housing 222 (which may be configured to receive a band, as described above). The capillary passage 235 may be the same as or similar to the capillary passage 215. Accordingly, the details of the capillary passage 215 discussed above apply equally to the capillary passage 235 and for brevity will not be repeated here.

Components 227 may be positioned in the second volume 225. The components 227 may include processors, memory, batteries, haptic output devices, circuit boards, sensors, display components, or the like. For ease of illustration the components 227 are shown in a generalized shape and location, though one of ordinary skill in the art will recognize that they may have a different shape or overall configuration, and they may be positioned in or otherwise incorporated with the housing 222 in any suitable way.

Similar to the device 200, the device 220 may include a pressure-sensing component 228, a speaker 226, and a liquid-sensing element 230 positioned within the first volume 224. The device 220 may also include a barometric vent that allows pressure equalization between the first volume 224 and the second volume 225 (e.g., by allowing gasses to pass between the first and second volumes 224, 225). In the device 220, the barometric vent may include an opening 231 that allows pressure equalization between the first volume 224 and the second volume 225. For example, the opening 231 may define an air passage between the first and second volumes, as indicated by arrow 240.

Instead of positioning the opening 231 behind the speaker 226, as shown in FIG. 2A, the opening 231 in this case is not occluded or covered by the speaker 226. In some cases, the barometric vent includes an air-permeable, waterproof membrane that covers the opening 231. The membrane may allow air pressure equalization between the device and the external environment while also preventing water from entering the second volume 225. The membrane may be any suitable component or material, such as a perforated metal, a perforated rigid polymer, a polymer film (e.g., expanded polytetrafluoroethylene, polyurethane, or the like), or the like.

Figure 3:
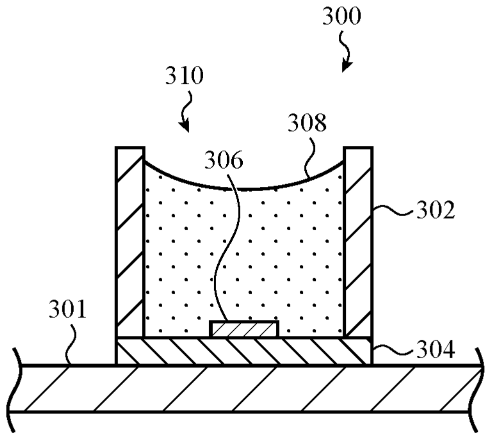
FIG. 3 depicts a partial cross-sectional view of an example pressure sensing element.

FIG. 3 depicts an example cross-sectional view of a pressure-sensing component 300 that may be used in conjunction with the electronic devices described herein (e.g., the devices 100, 200, 220). The pressure-sensing component 300 is shown attached to a component 301, which may correspond to any of the internal members 209, 229 described above with respect to FIGS. 2A-2B, or any other suitable member or portion of an electronic device.

The pressure-sensing component 300 may include a substrate 304, a force-sensitive element 306, and a body 302 coupled to the substrate 304. The substrate 304 may be a circuit board, which may include conductive traces, wires, or other conductors that facilitate electrical coupling between the force-sensitive element 306 and other electrical components (e.g., a processor). The body 302 and the substrate 304 may cooperate to define a cavity 310. The force-sensitive element 306 may be positioned on the substrate 304 and within the cavity 310.

The substrate 304 and the body 302 may be formed of or include any suitable material(s), including metal (e.g., stainless steel, aluminum), ceramic, a polymer, fiberglass, or the like. In some cases, the body 302 comprises stainless steel and the substrate 304 comprises a ceramic.

A dielectric material 308 may be positioned in the cavity 310 and substantially encapsulating the force-sensitive element 306. The dielectric material 308 may be a liquid, a gel, or any other suitable material that applies a force to the force-sensitive element 306, where the force is proportional to or otherwise corresponds to a fluid pressure that is incident on the exposed surface of the dielectric material 308. The dielectric material 308 may be a fluro-silicone gel, an oil, or any other suitable material. The dielectric material 308 may be cured or at least partially solidified (e.g., a crosslinked polymer), or it may be a flowable liquid. In some cases, the dielectric material 308 may remain in the cavity 310 without covers, films, or other retaining components, even when the pressure-sensing component 300 is upside down or subjected to movements or forces.

The force-sensitive element 306 may produce a variable electrical response in response to a mechanical force or strain applied to the force-sensitive element 306. For example, the force-sensitive element 306 may be a piezoelectric material or component, a piezoresistive material or component, a capacitive force sensor, or any other suitable force-sensitive material or component. Based on the mechanical force or strain that is applied to the force-sensitive element 306 via the dielectric material 308 (or the lack of a mechanical force or strain), the force-sensitive element 306 may produce a measurable electrical (or other) characteristic, such as a voltage, a resistance, a capacitance, or the like. A processor and/or associated circuitry may determine, based on the electrical characteristic, the fluid pressure that is incident on the dielectric material 308.

The body 302 of the pressure-sensing component 300 may be configured to have a substantially uniform cross-section along the height dimension of the body 302. For example, where the body 302 is cylindrical, the diameter of the body 302 may be substantially constant along the height of the body 302. This may allow for greater direct exposure of the dielectric material 308 as compared to pressure-sensing components with tapered bodies or smaller top openings. For example, some sensors may have a top member that substantially encloses the cavity 310, with a top opening that is smaller than the cross-sectional area of the exposed surface of the dielectric material 308. By having a uniform cross-section that extends fully to the top opening (e.g., such that the area of the opening is the same as the cross-sectional area of the body 302), the pressure-sensing component 300 may have fewer undercuts, seams, corners, or other features that may capture and retain water, debris, or other contaminants.

Figure 4:
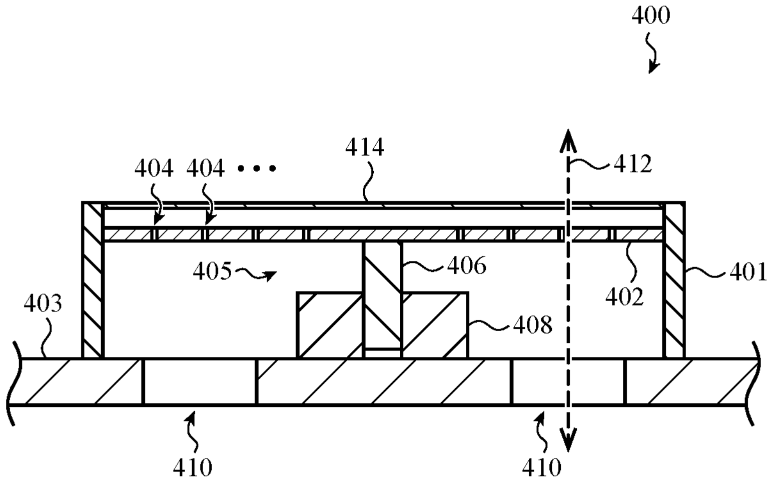
FIG. 4 depicts a partial cross-sectional view of an example speaker.

FIG. 4 depicts an example cross-sectional view of a speaker 400 that may be used in conjunction with the electronic devices described herein (e.g., the devices 100, 200, 220). The speaker 400 is shown attached to a component 403, which may correspond to any of the internal members 209, 229 described above with respect to FIGS. 2A-2B, or any other suitable member or portion of an electronic device.

The speaker 400 may include a body 401, a diaphragm 402, and a driver assembly 405 that includes an actuation member 406 and a driver 408. The actuation assembly may be a voice coil motor, or any other electrical or electromechanical system that moves the diaphragm to produce a sound output. For example, as shown in FIG. 4, the driver 408 may impart forces on the actuation member 406 to move the actuation member 406 (e.g., up and down, relative to the orientation shown in FIG. 4), ultimately moving the diaphragm 402 to produce sound. Additionally, as described above, the driver assembly 405 may be used to move the diaphragm 402 to help push water away from the diaphragm 402 and optionally out of the volume in which the speaker 400 is positioned (e.g., the first volumes 204, 224, FIGS. 2A-2B).

The diaphragm 402 may include openings 404, and the component 403 may include openings 410. The openings 410 may correspond to the openings 211 in FIG. 2B. The openings 404 in the diaphragm 402 may be configured to allow air to pass through the diaphragm 402, and ultimately through openings 410, to allow air pressure equalization between two different volumes within a housing of an electronic device (e.g., by defining an air passage indicated by arrow 412, which is similar to the air passage indicated by arrows 219 in FIG. 2A). The openings 410 may also provide an air passage to allow the speaker 400 to use the second volume of a device (e.g., the second volumes 205, 225, FIGS. 2A-2B) as a back volume for the speaker 400. The openings 410 may thus be sufficiently large to allow the volume of air that is moved by the diaphragm 402 (when the speaker is outputting sound) to move through the openings 410 to prevent undesirable back pressure in the space below the diaphragm 402.

The openings 404 may have a size, shape, or other configuration that allows air to pass through, while also preventing or restricting water or other liquids from passing through. Accordingly, the diaphragm 402 may operate as an air-permeable waterproof membrane over the openings 404. The openings 404 may also be sized, shaped, or otherwise configured so that they do not substantially attenuate or otherwise negatively affect the audio performance of the speaker 400. The openings 404 may have a diameter of about 1.0 mm, 0.5 mm, 0.25 mm, 0.1 mm, 0.05 mm, or any other suitable size.

In some cases, instead of discrete openings 404, the diaphragm 402 is formed of or includes an air permeable or porous material that allows air to flow therethrough, but is also sufficiently dense to act as a speaker diaphragm and produce sound when moved by the driver assembly 405. For example, the diaphragm 402 may be formed from a foam, fabric, air-permeable polymer film (e.g., expanded polytetrafluoroethylene, polyurethane), or the like.

As noted above, a speaker in an electronic device may be used to eject or clear liquids away from the speaker diaphragm, and ultimately eject the liquid from an interior volume of a housing. This may be accomplished by producing a sound output or otherwise moving the diaphragm 402 to force liquids away from the diaphragm 402. Because the openings 404 that provide pressure equalization between the first and second volumes of a housing are on the diaphragm 402, the liquid ejection techniques used to force liquid away from the diaphragm 402 may be particularly effective in keeping liquid away from the openings 404 as well. In some cases, liquid may be removed from the pressure equalization openings more quickly and/or more effectively when the openings are positioned on the diaphragm 402 (as shown in FIGS. 2A and 4) than when they are positioned elsewhere.

In some cases, the speaker 400 includes a protective cover 414 positioned over the diaphragm 402. The protective cover 414 may be a mesh, fabric, woven material, foam, or other material that protects the diaphragm 402 from debris, water, or other contaminants that could damage the diaphragm 402 or interfere with the ability of the diaphragm 402 to produce sound (or reduce the sound quality or volume). Due to its porous design, the protective cover 414 may retain or capture water or other liquids that may enter the volume in which the speaker 400 is positioned. In such cases, the speaker 400 may use water ejection techniques, as described above, to force the water out of the protective cover 414 (and ultimately out of the volume in which the speaker 400 is positioned).

While FIG. 4 shows a diaphragm 402 with openings 404, embodiments that do not require air to pass through the speaker 400 may omit the openings 404. In such cases, the openings 410 in the component 403 may be positioned elsewhere than directly below the speaker 400.

Figure 5A:
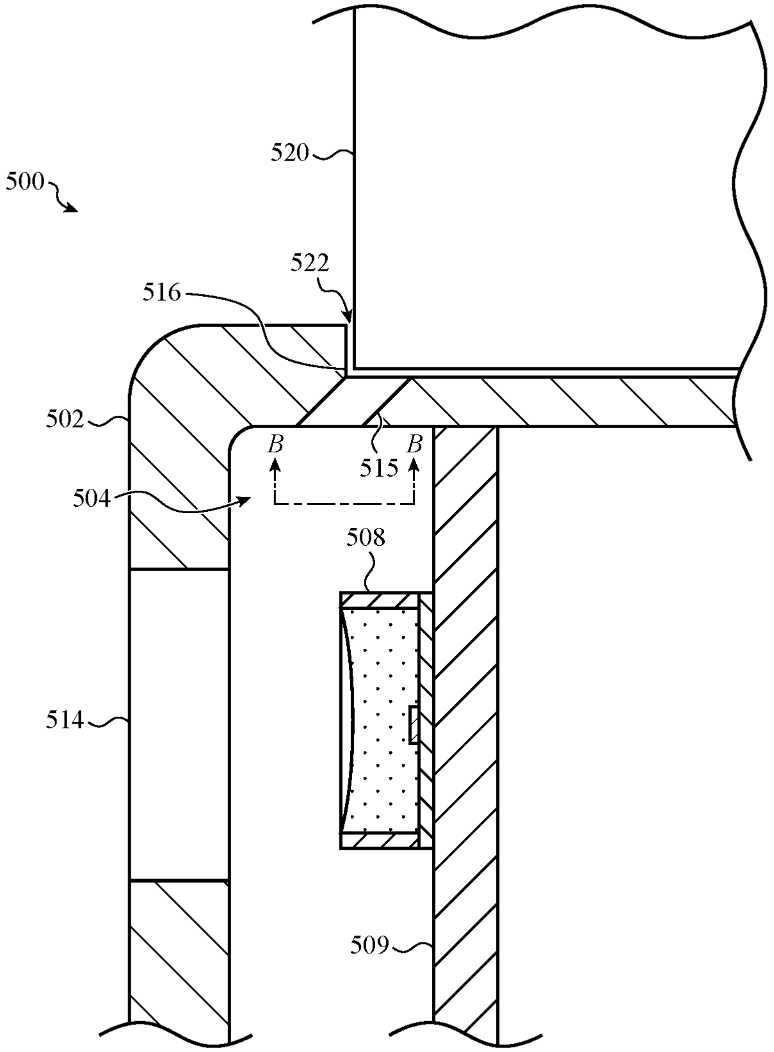
FIG. 5A depicts a partial cross-sectional view of another wearable electronic device.

FIG. 5A depicts a partial cross-sectional view of a device 500. The device 500 may be an embodiment of the devices 100, 200, 220, and may include the same or similar components and may provide the same or similar functions as those devices. Accordingly, details of the devices 100, 200, 220 described above may apply to the device 500, and for brevity will not be repeated here.

The device 500 includes a housing 502 (which may be the same as or similar to the housings 102, 202, 222, described above). The housing 502 may define a first volume 504, as well as a channel 516 that extends along an exterior side surface of the housing 502 and is configured to receive (and optionally retain) at least a portion of a band 520. The device 500 may also include a pressure-sensing component 508 in the first volume 504 and coupled to an internal member 509. The housing 502 may define an opening 514 that exposes the pressure-sensing component 508 (as well as other components in the first volume 504) to the external environment. These components and/or features may be the same as or similar to corresponding components and/or features described elsewhere in this application.

The device 500 also includes a capillary passage 515 that extends through the housing 502 and fluidly couples the first volume 504, in which the pressure-sensing component 508 and a speaker may be positioned, to the channel 516. The capillary passage 515 may be the same as or similar to the capillary passages 215, 235. For example, as described above, the capillary passage 515 may be configured to use a capillary action to draw water or other liquids into the capillary passage 515 and out of the first volume 504. Other details of the capillary passages 215, 235 described above are equally applicable to the capillary passage 515, and for brevity may not be repeated here. Further, details of the capillary passage 515 described herein may be equally applicable to the capillary passages 215, 235, or to any other capillary passages described herein.

As shown in FIG. 5A, the capillary passage 515 extends from a surface of the first volume 504 to a surface of the channel 516. When the band 520 is positioned within the channel 516, an interstitial space 522 is defined between a surface of the band 520 and a surface of the channel 516. The interstitial space 522 may cooperate with the capillary passage 515 to draw liquid out of the first volume 504 using capillary action. More particularly, capillary action is a phenomenon whereby liquids may be drawn into narrow openings or spaces without the assistance of gravity, pumps, or other applied forces. As noted above, the interstitial space 522 defined between the surface of the band 520 and the surface of the channel 516 may be sufficiently narrow to induce a capillary action. For example, the distance between the surface of the channel 516 and the surface of the band 520 in the interstitial space 522 may be about 0.5 mm, about 0.2 mm, about 0.1 mm, about 0.05 mm, about 0.01 mm, or any other suitable dimension (which may be an average distance or a maximum distance). By positioning the capillary passage 515 so that it opens into the channel 516, a continuous volume may be defined throughout which the capillary effect may be substantially uninterrupted. More particularly, because the capillary passage 515 opens directly into the interstitial space 522, the volume of the interstitial space 522 (which itself may produce a capillary action) may be combined with the volume of the capillary passage 515 to produce a larger volume that liquid can be drawn into. Moreover, as the small dimensions of the capillary passage 515 and the interstitial space 522 directly join one another (e.g., there is no larger empty space between them that would interrupt the capillary action), the capillary effect of both of the volumes may cooperate to draw water out of the first volume 504. The water or other liquid that is ultimately drawn into the capillary passage 515 and/or the interstitial space 522 may evaporate, drain out of the interstitial space 522 and away from the device 500, or be removed manually (e.g., absorbed or wiped away by a user).

Figure 5B:
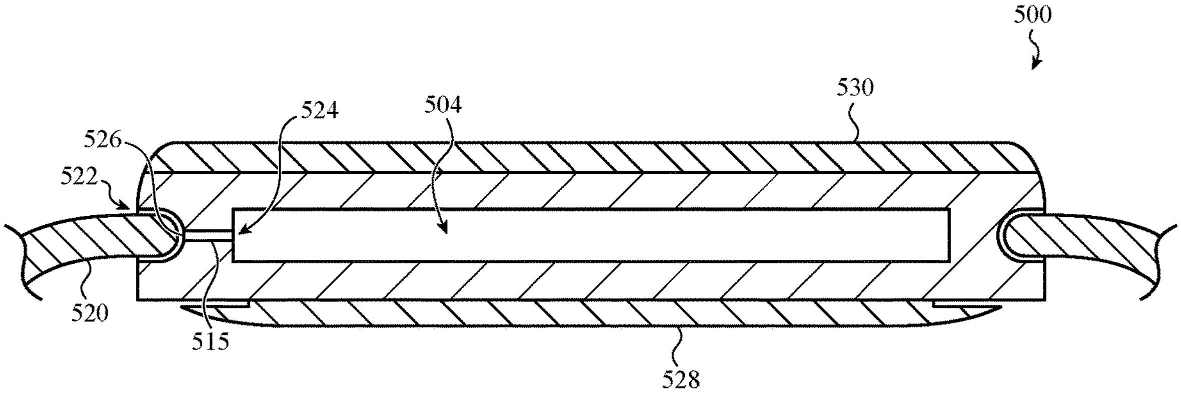
FIG. 5B depicts another partial cross-sectional view of the wearable electronic device of FIG. 5A.

FIG. 5B depicts a partial cross-sectional view of the device 500. The view depicted in FIG. 5B corresponds to a view of a device along line A-A in FIG. 1B. As shown in FIG. 5B, the capillary passage 515 is defined by an entrance aperture 524 formed along an interior surface of a housing wall, and an exit aperture formed along a surface of the housing that defines a channel that receives a band 520. The device 500 also includes a transparent cover 530 (which may be an embodiment of the cover 108), and a back cover 528. The back cover 528 may be formed from or may include a dielectric material that is configured to allow electromagnetic fields to pass therethrough. In some cases, the back cover 528 may be configured to allow or facilitate wireless charging of the device 500 through the back cover 528. The back cover 528 may also be completely or partially optically transparent or translucent, or otherwise allow optical sensing through all or a portion of the back cover 528. Optical sensing may be used, for example, for heart rate sensing (e.g., with a photoplethysmograph), proximity sensing (e.g., to detect when the device 500 is being worn), or the like. The back cover 528 may be formed of or include glass, ceramic, plastic, or any other suitable material. In some cases the back cover 528 may be formed of or include metal.

As noted above, the capillary passage 515 and the interstitial space 522 may cooperate to produce a capillary effect that can drain water or other liquids from the first volume 504. The effectiveness of the capillary effect produced by the capillary passage 515 and the interstitial space 522 (e.g., how fast water is moved due to the capillary effect, the amount of water that can be moved, etc.) may depend at least in part on the proximity of the surfaces of the drain volume defined by the combination of the capillary passage and the interstitial space. For example, a drain volume with a smaller distance between opposing surfaces may produce a greater capillary effect than one with a larger distance, and therefore may result in faster draining of a space (e.g., the first volume 504). In some cases, having a drain volume in which the distance (e.g., the minimum distance) between opposing surfaces decreases along the path travelled by the water through the drain volume may help increase the capillary effect (e.g., increasing the speed of water movement, amount of water that can be moved, etc.). Thus, in some cases the capillary passage 515 may have a tapered profile, such that the entrance aperture 524 is larger than the exit aperture 526. Additionally, the distance between the band 520 and the housing 502 along all or some of the interstitial space 522 may be less than the distance between the walls of the capillary passage 515 (e.g., a diameter of the capillary passage). In such cases, the drain volume that produces the capillary effect and drains water from the first volume 504 is defined by a decreasing distance between surfaces along a path extending from the entrance aperture 524 into the interstitial space 522. More particularly, the drain volume may have a first region, defined by the capillary passage 515, with a first distance between opposite surfaces (e.g., a diameter of the capillary passage 515) and a second region, defined by the interstitial space 522, with a second, lesser distance between opposite surfaces (e.g., a distance between the band 520 and the housing 502).

Figure 5C:
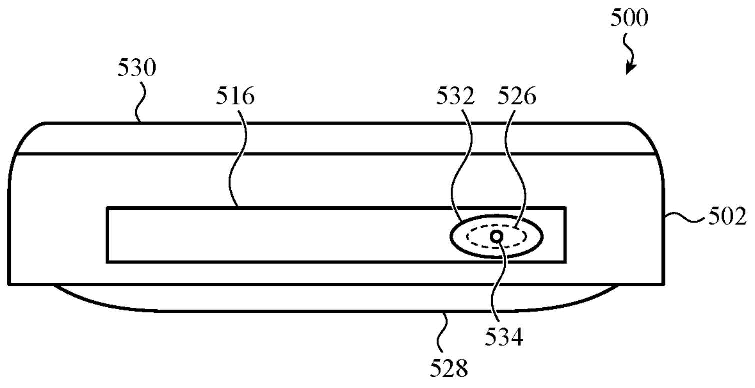
FIG. 5C depicts a side view of the wearable electronic device of FIG. 5A.

FIG. 5C is a side view of the device 500, showing the housing 502 with the band 520 removed from the channel 516. As shown in FIG. 5C, the housing 502 includes a cap 532 positioned over the exit aperture 526. For example, in cases where the capillary passage is not perpendicular to the housing wall that it extends through (such as the angled capillary passage 515 shown in FIG. 5A), the entrance and exit apertures may not be circular, but instead may have an oval shape or other non-circular shape. The cap 532 may cover the non-circular exit aperture 526. The cap 532 may define a through-hole 534 that communicates with the capillary passage 515 and allow the capillary passage 515 to fluidly couple to the channel 516 and, by extension, the interstitial space 522 (FIGS. 5A-5B). The cap 532 may be set into a counterbore or other recess such that the exterior surface of the cap 532 is flush with the surface of the channel 516.

Figure 5D:
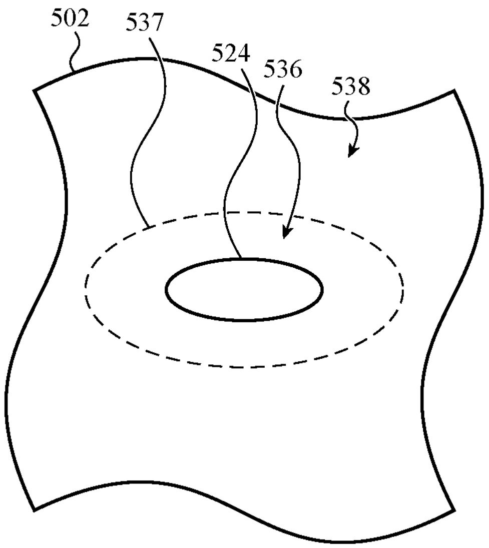
FIG. 5D depicts a detail view of the wearable electronic device of FIG. 5A.

As noted above, the surfaces in and around the capillary passage 515 and/or the interstitial space 522 may be treated to help guide, force, or induce water or other liquids into the capillary passage 515 and/or the interstitial space 522. For example, hydrophilic surface treatments (e.g., coatings, textures, materials, etc.) may be applied on or near the capillary passage 515 and/or the interstitial space 522. FIG. 5D illustrates a portion of the housing 502 viewed along line B-B in FIG. 5A. The illustrated portion includes the entrance aperture 524 and a hydrophilic region 536 (within the broken-line boundary 537) on the interior surface of the housing 502. The hydrophilic region 536 may be defined by a surface texture, coating, insert (e.g., of a different material than the other areas of the housing 502), or the like. As described above, the inner surfaces of the capillary passage 515 may also have a hydrophilic surface treatment (e.g., surface texture, coating, insert, sleeve). The hydrophilic surface treatment may attract, draw, or hold water and/or other liquids near the entrance aperture 524, which may help draw the liquids into the capillary passage 515 where the capillary action may draw the water out of the first volume 504. In some cases, the housing 502 may also have a hydrophobic region 538 (outside the boundary 537). The hydrophobic region 538 may be defined by a surface texture, coating, insert (e.g., of a different material than the other areas of the housing 502), or the like. The hydrophobic region 538 may push, reject, or otherwise repel water and/or other liquids. The proximity of the hydrophobic region 538 to the hydrophilic region 536 and the capillary passage 515 (or the capillary passage 515 alone, where the hydrophilic region is omitted) may help guide water and/or other liquids into the capillary passage 515, where capillary action may continue to draw the water into the capillary passage 515 and out of the first volume 504.

Figure 6A:
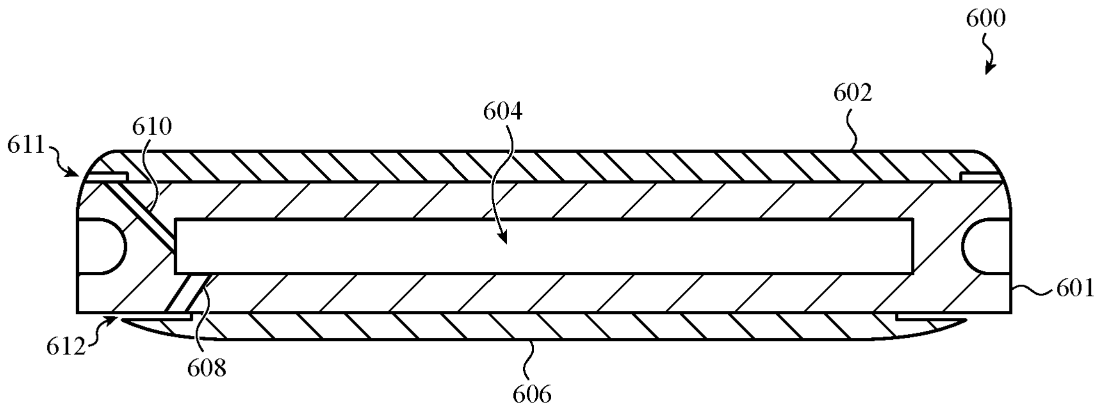
FIG. 6A depicts a partial cross-sectional view of another wearable electronic device.
Figure 6B:
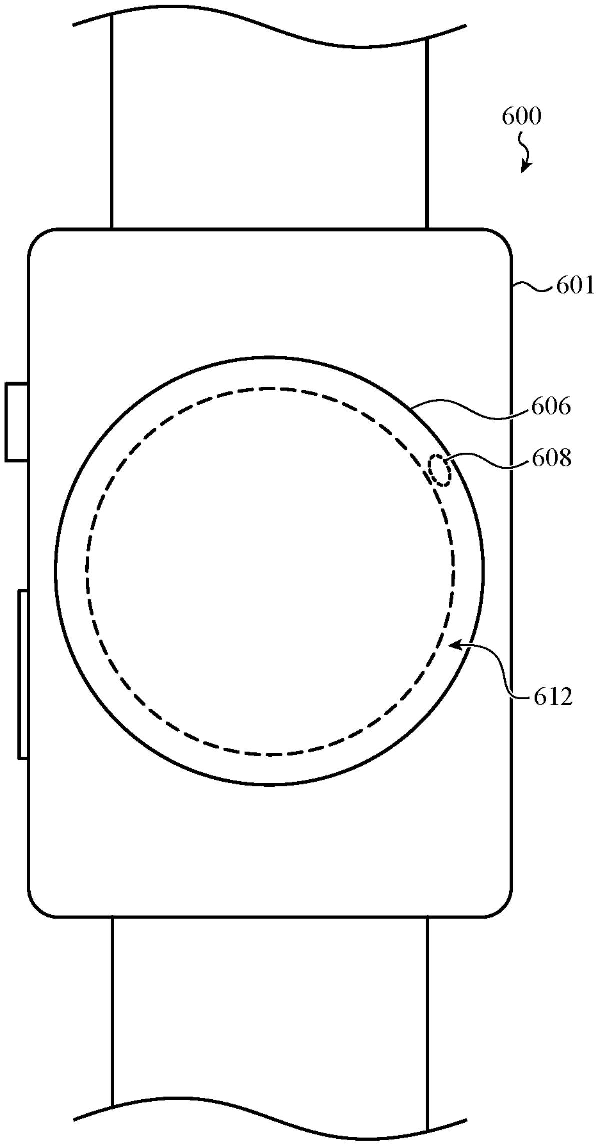
FIG. 6B depicts a back view of the wearable electronic device of claim 6A.

FIGS. 5A-5D illustrate an example device in which a capillary passage 515 extends from an interior volume (e.g., the first volume 504) to a channel that receives a lug of a band or strap, which is one example configuration for a capillary passage in an electronic device such as a watch. Other configurations of capillary passages in a device are also possible, using the principles and techniques described with respect to the other capillary passages described herein. FIGS. 6A-7 illustrate additional example capillary passages that may be used in an electronic device.

FIG. 6A depicts a partial cross-sectional view of an example device 600. The view of FIG. 6A corresponds to a view of a device along line A-A in FIG. 1B. The device 600 may be the same as or similar to the other devices described herein (e.g., devices 100, 200, 220, 500), but with a different configuration of capillary passages. The device 600 may include a housing 601, a cover 602, and a back cover 606, each of which may be the same as or similar to corresponding components described herein with respect to other devices.

The device 600 may include a capillary passage 608 that extends through a wall of the housing 601 and fluidly couples a first volume 604 (in which a speaker, barometric vent, pressure sensor, and/or other components may be positioned) to an interstitial space 612 defined by (and between portions of) the exterior surface of the housing 601 and the back cover 606. The interstitial space 612 may act similarly to the interstitial space 522. For example, the interstitial space 612 may cooperate with the capillary passage 608 to produce a capillary action that tends to draw liquid from the first volume 604 into the capillary passage 608 and into the interstitial space 612. Additionally, similar to the interstitial space 522, the distance between the surfaces that define the interstitial space 612 (e.g., a space defined in part by a surface of the back cover 606 and a surface of the housing 601) may be smaller than the distance between opposing surfaces of the capillary passage 608 (e.g., smaller than a diameter of the capillary passage 608). This may define a path that has a decreasing distance between surfaces along a path extending from the capillary passage 608 into the interstitial space 612. The distance between the surface of the back cover 606 and the surface of the housing 601 that define the interstitial space 612 may be about 0.5 mm, about 0.2 mm, about 0.1 mm, about 0.05 mm, about 0.01 mm, or any other suitable dimension (which may be an average distance or a maximum distance). In some cases, the interstitial space 612 may also have a decreasing distance between surfaces to aid in the capillary effect. For example, the interstitial space 612 may have a first distance between opposing surfaces proximate the capillary passage 608, and may taper to a second, smaller distance where the interstitial space 612 opens to the external environment.

By using the interstitial space 612 in combination with the capillary passage 608, the volume of the space that produces the capillary action may be increased (relative to the capillary passage 608 alone), allowing the capillary passage 608 and the interstitial space 612 to draw more liquid out of the first volume 604. FIG. 6B is a back view of the device 600, illustrating one example configuration of the interstitial space 612. As shown in FIG. 6A, a portion of the back cover 606 may be set apart from the housing to define the gap that defines the interstitial space 612. FIG. 6B illustrates an example in which the gap extends along the entire perimeter or peripheral area of the back cover 606. The interstitial space 612 in FIG. 6B may be the region between the perimeter of the back cover 606 and the broken line inset from the perimeter of the back cover 606. In other example embodiments, the interstitial space 612 does not extend along the entire perimeter.

FIG. 6A also illustrates another example configuration for a capillary passage. In particular, capillary passage 610 extends from the first volume 604 to an interstitial space 611 between a portion of the cover 602 and the housing 601. More particularly, a portion of the cover 602 may be set apart from the housing 601 to define the gap that defines the interstitial space 611. The distance between the surface of the cover 602 and the surface of the housing 601 that define the interstitial space 611 may be about 0.5 mm, about 0.2 mm, about 0.1 mm, about 0.05 mm, about 0.01 mm, or any other suitable dimension (which may be an average distance or a maximum distance).

Similar to the interstitial space 522, the distance between the surfaces that define the interstitial space 611 (e.g., a space defined in part by a surface of the cover 602 and a surface of the housing 601) may be smaller than the distance between opposing surfaces of the capillary passage 610 (e.g., smaller than a diameter of the capillary passage 610). This may define a path that has a decreasing distance between surfaces along a path extending from the capillary passage 610 into the interstitial space 611. The distance between the surface of the cover 602 and the surface of the housing 601 that define the interstitial space 611 may be about 0.5 mm, about 0.2 mm, about 0.1 mm, about 0.05 mm, about 0.01 mm, or any other suitable dimension (which may be an average distance or a maximum distance). In some cases, the interstitial space 611 may also have a decreasing distance between surfaces to aid in the capillary effect. For example, the interstitial space 611 may have a first distance between opposing surfaces proximate the capillary passage 610, and may taper to a second, smaller distance where the interstitial space 611 opens to the external environment.

Figure 6C:
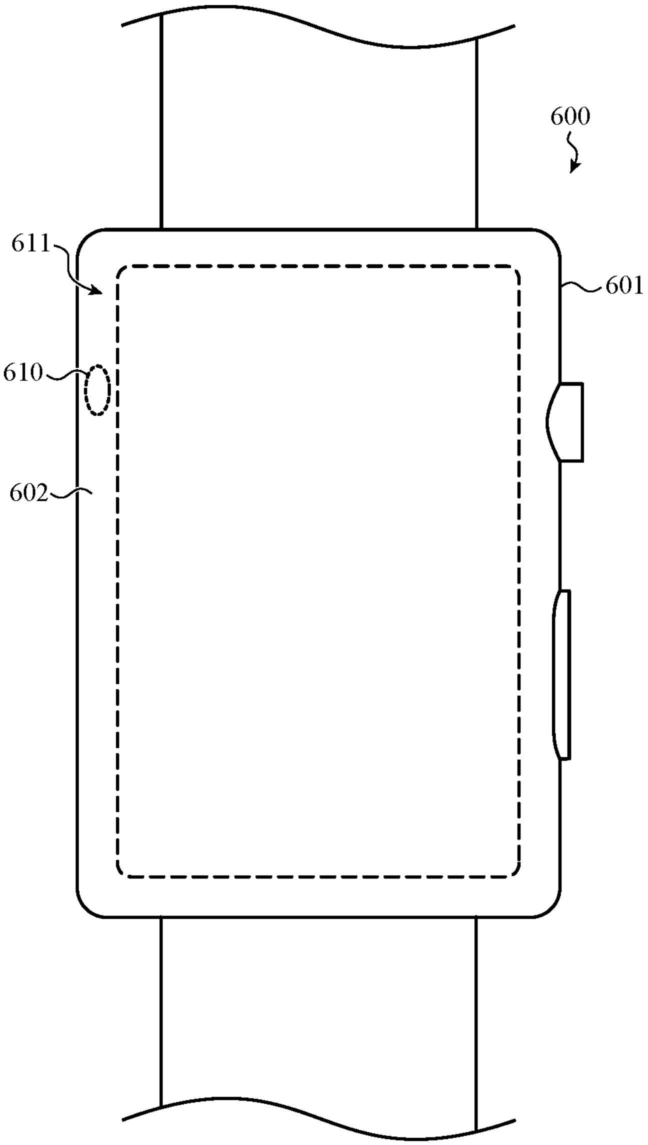
FIG. 6C depicts a front view of the wearable electronic device of claim 6A.
Figure 7:
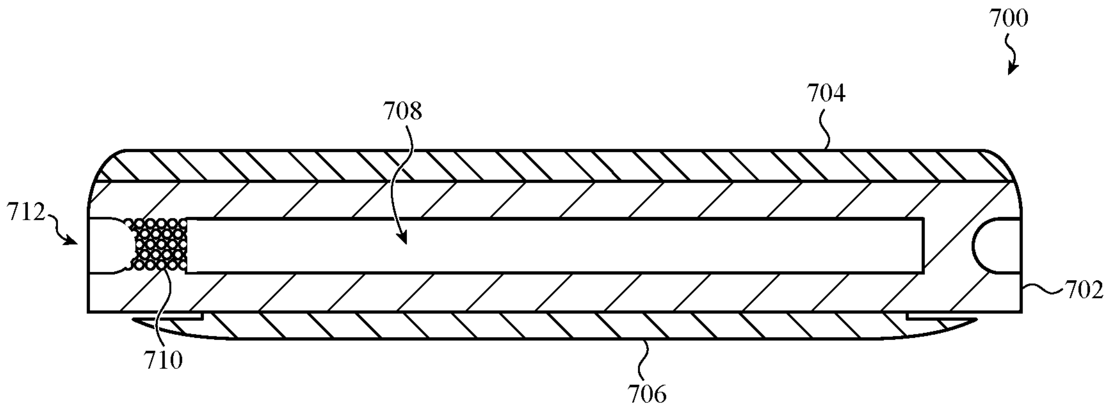
FIG. 7 depicts a partial cross-sectional view of another wearable electronic device.

FIG. 6C is a front view of the device 600, illustrating an example configuration of the interstitial space 611. Like the interstitial space 612, FIG. 6C shows how the gap between a portion of the cover 602 and the housing 601 extends along the entire perimeter or peripheral area of the cover 602. The interstitial space 611 in FIG. 6C may be the region between the perimeter of the cover 602 and the broken line inset from the perimeter of the cover 602. In other example embodiments, the interstitial space 611 does not extend along the entire perimeter.

FIGS. 6A-6C show two capillary passages in one device, the capillary passage 610 and the capillary passage 608. It will be understood that some embodiments may include both capillary passages, or just one or the other of the capillary passages. Indeed, any of the capillary passages described herein may be used alone or in combination with other capillary passages described herein. For example, in some cases three capillary passages are connected to a single volume: one extending to a band slot, another extending to an interstitial space defined by a front cover, and another extending to an interstitial space defined by a back cover. Other combinations are also contemplated.

Other types of capillary action structures and components may also be used to draw liquid out of enclosed spaces or volumes in a device. FIG. 7, for example, depicts a partial cross-sectional view of an example device 700, which may be an embodiment of the devices 100, 200, 220, and may include the same or similar components and may provide the same or similar functions as those devices. Accordingly, details of the devices 100, 200, 220 described above may apply to the device 700, and for brevity will not be repeated here.

The device 700 includes a housing 702 (which may be the same as or similar to the housings 102, 202, 222, described above). The housing 702 may define a first volume 708, as well as a channel 712 that extends along an exterior side surface of the housing 702 and is configured to receive (and optionally retain) at least a portion of a band. The device 700 may also include a pressure-sensing component in the first volume 708. These components and/or features may be the same as or similar to corresponding components and/or features described elsewhere in this application.

The device 700 also includes a porous drain structure 710 that fluidly couples the first volume 708, in which a pressure-sensing component and a speaker may be positioned, to the channel 712. The porous drain structure 710 may be configured to use a capillary action to draw water or other liquids into the porous drain structure 710 and out of the first volume 708. More particularly, the pores of the porous drain structure 710 may define an open-cell pore structure in which the pores are sufficiently small to produce a capillary action on water and/or other liquids. For example, in some cases the pores may have an average diameter of about 1.0 mm, about 0.6 mm, about 0.5 mm, about 0.4 mm, about 0.25 mm, about 0.1 mm, about 0.05 mm, or any other suitable diameter. The porous drain structure 710 may otherwise operate in substantially the same manner as the other capillary passages described herein. Indeed, any of the capillary passages described herein may be replaced with or at least partially filled with a porous drain structure. The porous drain structure 710 may be formed by foaming, drilling, or otherwise forming a porous structure in the material of the housing 702, or by inserting a porous material into an opening in the housing 702.

The capillary passages described with respect to FIGS. 5A-7 may be used to drain water and/or other liquids from internal volumes of devices, and may also provide air pressure equalization vents to help provide stable and accurate pressure readings from pressure sensors in those volumes. Also, any of the dimensions, properties, and/or techniques described with respect to one example capillary passage may apply to other capillary passages described herein as well. For example hydrophobic and/or hydrophilic treatments (e.g., coatings, textures, etc.) described with respect to FIGS. 5A-5D may be applied to the capillary passages in FIGS. 6A-7, as well as any other capillary passages described herein.

Further, the devices described with respect to FIGS. 5A-7 describe some example configurations of interstitial spaces that may be used to augment the capillary action of a capillary passage in a housing. However, these example interstitial spaces are not intended to be exhaustive, and other interstitial spaces may exist or be provided. For example, buttons, dials, crowns, or other components of a device may define interstitial spaces between themselves and the housing (or between any two surfaces). Such interstitial spaces may be used in addition to or instead of those described herein. In such cases, a capillary passage may fluidly couple the interstitial spaces to the volume that is intended to be vented or drained of liquid. Moreover, any of the capillary passages and/or surfaces that define the interstitial spaces may have hydrophilic treatments, coatings, textures, or the like to help draw liquid into the openings or interstitial spaces. For example, the surfaces of the housing and covers that define the interstitial spaces 611, 612 may have hydrophilic treatments, coatings, textures, or the like.

Figure 8:
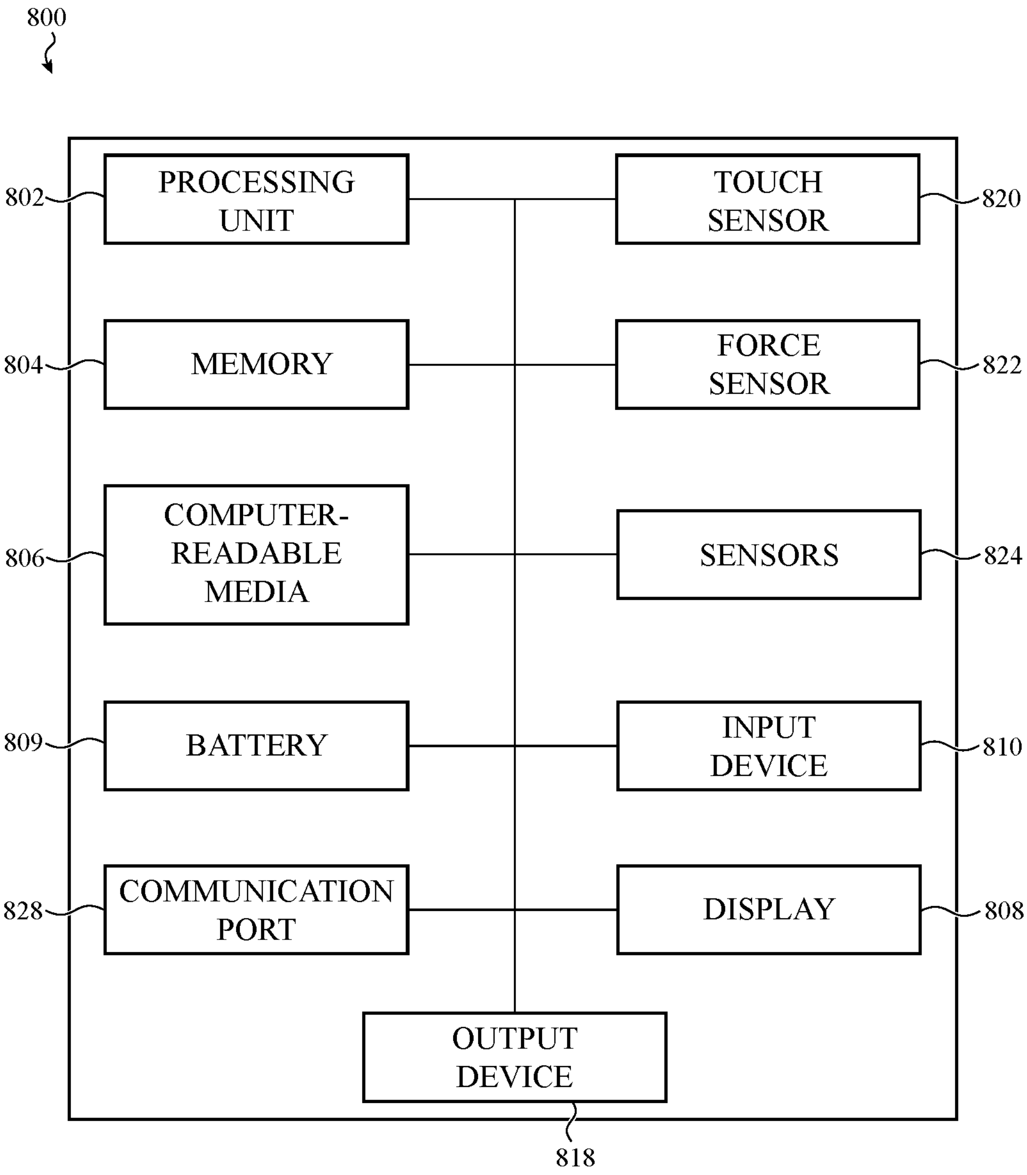
FIG. 8 depicts example components of a wearable electronic device.

FIG. 8 depicts an example schematic diagram of an electronic device 800. By way of example, the device 800 of FIG. 8 may correspond to the wearable electronic device 100 shown in FIGS. 1A-1B (or any other wearable electronic device described herein). To the extent that multiple functionalities, operations, and structures are disclosed as being part of, incorporated into, or performed by the device 800, it should be understood that various embodiments may omit any or all such described functionalities, operations, and structures. Thus, different embodiments of the device 800 may have some, none, or all of the various capabilities, apparatuses, physical features, modes, and operating parameters discussed herein.

As shown in FIG. 8, a device 800 includes a processing unit 802 operatively connected to computer memory 804 and/or computer-readable media 806. The processing unit 802 may be operatively connected to the memory 804 and computer-readable media 806 components via an electronic bus or bridge. The processing unit 802 may include one or more computer processors or microcontrollers that are configured to perform operations in response to computer-readable instructions. The processing unit 802 may include the central processing unit (CPU) of the device. Additionally or alternatively, the processing unit 802 may include other processors within the device including application specific integrated chips (ASIC) and other microcontroller devices.

The memory 804 may include a variety of types of non-transitory computer-readable storage media, including, for example, read access memory (RAM), read-only memory (ROM), erasable programmable memory (e.g., EPROM and EEPROM), or flash memory. The memory 804 is configured to store computer-readable instructions, sensor values, and other persistent software elements. Computer-readable media 806 also includes a variety of types of non-transitory computer-readable storage media including, for example, a hard-drive storage device, a solid-state storage device, a portable magnetic storage device, or other similar device. The computer-readable media 806 may also be configured to store computer-readable instructions, sensor values, and other persistent software elements.

In this example, the processing unit 802 is operable to read computer-readable instructions stored on the memory 804 and/or computer-readable media 806. The computer-readable instructions may adapt the processing unit 802 to perform the operations or functions described above with respect to FIGS. 1A-7. In particular, the processing unit 802, the memory 804, and/or the computer-readable media 806 may be configured to cooperate with a sensor 824 (e.g., an image sensor that detects input gestures applied to an imaging surface of a crown) to control the operation of a device in response to an input applied to a crown of a device (e.g., the crown 112). The computer-readable instructions may be provided as a computer-program product, software application, or the like.

As shown in FIG. 8, the device 800 also includes a display 808. The display 808 may include a liquid-crystal display (LCD), organic light emitting diode (OLED) display, light emitting diode (LED) display, or the like. If the display 808 is an LCD, the display 808 may also include a backlight component that can be controlled to provide variable levels of display brightness. If the display 808 is an OLED or LED type display, the brightness of the display 808 may be controlled by modifying the electrical signals that are provided to display elements. The display 808 may correspond to any of the displays shown or described herein.

The device 800 may also include a battery 809 that is configured to provide electrical power to the components of the device 800. The battery 809 may include one or more power storage cells that are linked together to provide an internal supply of electrical power. The battery 809 may be operatively coupled to power management circuitry that is configured to provide appropriate voltage and power levels for individual components or groups of components within the device 800. The battery 809, via power management circuitry, may be configured to receive power from an external source, such as an AC power outlet. The battery 809 may store received power so that the device 800 may operate without connection to an external power source for an extended period of time, which may range from several hours to several days.

In some embodiments, the device 800 includes one or more input devices 810. An input device 810 is a device that is configured to receive user input. The one or more input devices 810 may include, for example, a push button, a touch-activated button, a keyboard, a key pad, or the like (including any combination of these or other components). In some embodiments, the input device 810 may provide a dedicated or primary function, including, for example, a power button, volume buttons, home buttons, scroll wheels, and camera buttons. Generally, a touch sensor or a force sensor may also be classified as an input device. However, for purposes of this illustrative example, the touch sensor 820 and a force sensor 822 are depicted as distinct components within the device 800.

In some embodiments, the device 800 includes one or more output devices 818. An output device 818 is a device that is configured to produce an output that is perceivable by a user. The one or more output devices 818 may include, for example, a speaker (e.g., the speaker 206, or any other speaker described herein), a light source (e.g., an indicator light), an audio transducer, a haptic actuator, or the like.

The device 800 may also include one or more sensors 824. In some cases, the sensors may include a sensor that determines conditions of an ambient environment external to the device 800, such as a pressure sensor (which may include the pressure-sensing component 208, or any other pressure-sensing component described herein), a temperature sensor, a liquid sensor (e.g., which may include the liquid-sensing element 210, or any other liquid-sensing element described herein), or the like. The sensors 824 may also include a sensor that detects inputs provided by a user to a crown of the device (e.g., the crown 112). As described above, the sensor 824 may include sensing circuitry and other sensing elements that facilitate sensing of gesture inputs applied to an imaging surface of a crown, as well as other types of inputs applied to the crown (e.g., rotational inputs, translational or axial inputs, axial touches, or the like). The sensor 824 may include an optical sensing element, such as a charge-coupled device (CCD), complementary metal-oxide-semiconductor (CMOS), or the like. The sensor 824 may correspond to any sensors described herein or that may be used to provide the sensing functions described herein.

The device 800 may also include a touch sensor 820 that is configured to determine a location of a touch on a touch-sensitive surface of the device 800 (e.g., an input surface defined by the portion of a cover 108 over a display 109). The touch sensor 820 may use or include capacitive sensors, resistive sensors, surface acoustic wave sensors, piezoelectric sensors, strain gauges, or the like. In some cases the touch sensor 820 associated with a touch-sensitive surface of the device 800 may include a capacitive array of electrodes or nodes that operate in accordance with a mutual-capacitance or self-capacitance scheme. The touch sensor 820 may be integrated with one or more layers of a display stack (e.g., the display 109) to provide the touch-sensing functionality of a touchscreen. Moreover, the touch sensor 820, or a portion thereof, may be used to sense motion of a user's finger as it slides along a surface of a crown, as described herein.

The device 800 may also include a force sensor 822 that is configured to receive and/or detect force inputs applied to a user input surface of the device 800 (e.g., the display 109). The force sensor 822 may use or include capacitive sensors, resistive sensors, surface acoustic wave sensors, piezoelectric sensors, strain gauges, or the like. In some cases, the force sensor 822 may include or be coupled to capacitive sensing elements that facilitate the detection of changes in relative positions of the components of the force sensor (e.g., deflections caused by a force input). The force sensor 822 may be integrated with one or more layers of a display stack (e.g., the display 109) to provide force-sensing functionality of a touchscreen.

The device 800 may also include a communication port 828 that is configured to transmit and/or receive signals or electrical communication from an external or separate device. The communication port 828 may be configured to couple to an external device via a cable, adaptor, or other type of electrical connector. In some embodiments, the communication port 828 may be used to couple the device 800 to an accessory, including a dock or case, a stylus or other input device, smart cover, smart stand, keyboard, or other device configured to send and/or receive electrical signals.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:

a housing at least partially defining an interior cavity, the interior cavity having:

a first volume fluidly coupled to an external environment via an opening of the housing, the first volume configured to be exposed to a liquid from the external environment; and a second volume separated from the first volume by a barrier;

a battery positioned within the second volume;

a processor positioned within the second volume; and a speaker positioned within the first volume and at least partially defining an air-permeable membrane between the first volume and the second volume, the air-permeable membrane configured to equalize a barometric pressure between the first volume and the second volume.

2. The electronic watch of claim 1, wherein:

the electronic watch further comprises a mesh positioned over the opening; and the mesh is configured to block contaminants from entering in the first volume from the opening.

3. The electronic watch of claim 2, wherein:

the speaker is further configured to produce a sound output; and the sound output is configured to eject the liquid via the opening.

4. The electronic watch of claim 3, wherein the sound output has a variable pitch.

5. The electronic watch of claim 1, wherein:

the electronic watch further comprises:

a pressure-sensing component;

a temperature-sensing component; and a liquid-sensing component; and the pressure-sensing component, the temperature-sensing component, and the liquid-sensing component are positioned within the first volume.

6. The electronic watch of claim 1, wherein:

the opening is a first opening;

the barrier defines a second opening that fluidly couples the first volume and the second volume; and the air-permeable membrane is positioned over the second opening.

7. The electronic watch of claim 1, wherein the speaker comprises a diaphragm that inhibits the passage of water.

8. A wearable electronic device comprising:
a housing at least partially defining an interior cavity divided into a first volume and a second volume, the first volume configured to receive water therein;
a processor positioned within the second volume;
an internal member dividing the first volume and the second volume and defining an opening; and
a speaker positioned within the first volume and at least partially over the opening in the internal member, the speaker and the opening cooperating to define an air-permeable water-blocking passage between the first volume and the second volume.

9. The wearable electronic device of claim 8, wherein:
the opening is a first opening;
the housing defines a second opening; and
the second opening fluidly couples the first volume to an external environment.

10. The wearable electronic device of claim 9, wherein:
the wearable electronic device comprises a mesh positioned over the second opening; and the mesh is configured to block contaminants from the external environment.

11. The wearable electronic device of claim 9, wherein:
the housing defines a capillary passage fluidly coupling the first volume to the external environment;
the capillary passage is configured to draw liquid out of the first volume; and
a size of the second opening is larger than a size of the capillary passage.

12. The wearable electronic device of claim 11, wherein:
the wearable electronic device comprises a band;
the housing defines a channel configured to couple to the band; and
the capillary passage extends from a first surface of the channel to a first internal surface of the first volume.

13. The wearable electronic device of claim 8, comprising:
a transparent cover coupled to the housing;
a touch sensor positioned below the transparent cover and configured to detect touch inputs to the transparent cover; and
a crown positioned along a side region of the housing and configured to receive at least one of a translational input or a rotational input.

14. The wearable electronic device of claim 8, wherein:
the wearable electronic device comprises a pressure-sensing component positioned in the first volume; and
the pressure-sensing component comprises:
a substrate;
a body coupled to the substrate, the substrate and the body cooperating to define a cavity; and
a force-sensitive element positioned on the substrate and within the cavity.

15. An electronic watch comprising:
a housing at least partially defining a cavity;
a display positioned within the cavity;
a barrier positioned within the cavity and separating the cavity into a first volume and a second volume; and
a speaker positioned within the first volume and defining an air-permeable water-blocking passage between the first volume and the second volume, the speaker configured to produce a sound output.

16. The electronic watch of claim 15, wherein:
the speaker comprises:
a body;
a driver assembly; and
a diaphragm;
the driver assembly is configured to move the diaphragm to produce the sound output; and
the diaphragm is positioned over the air-permeable water-blocking passage and is configured to allow air pressure equalization between the first volume and the second volume.

17. The electronic watch of claim 15, wherein:
the electronic watch further comprises a porous drain structure positioned within the first volume;
the porous drain structure fluidly couples the first volume to an external environment; and
the porous drain structure is configured to draw liquid from the first volume to the external environment.

18. The electronic watch of claim 15, wherein:
the housing defines an opening fluidly coupling the first volume to an external environment; and
the electronic watch comprises a screen positioned over the opening and configured to block contaminants from entering the first volume.

19. The electronic watch of claim 15, wherein:
the electronic watch comprises a liquid-sensing element; and
in response to detecting liquid, by the liquid-sensing element, the speaker is configured to produce the sound output.

20. The electronic watch of claim 19 wherein the sound output is configured to eject liquid from the first volume to an external environment.

* * * * *